(12) United States Patent
Sueyoshi

(10) Patent No.: US 8,094,385 B2
(45) Date of Patent: Jan. 10, 2012

(54) IMAGE PICKUP LENS AND IMAGE PICKUP APPARATUS

(75) Inventor: Masafumi Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/926,068

(22) Filed: Oct. 25, 2010

(65) Prior Publication Data

US 2011/0115963 A1 May 19, 2011

(30) Foreign Application Priority Data

Nov. 18, 2009 (JP) ................................. 2009-262924

(51) Int. Cl.
*G02B 9/06* (2006.01)
*G02B 3/02* (2006.01)
*G02B 9/04* (2006.01)

(52) U.S. Cl. ......................... 359/794; 359/717; 359/790

(58) Field of Classification Search .................. 359/681, 359/717, 793, 794

See application file for complete search history.

(56) References Cited

U.S. PATENT DOCUMENTS 5,172,274 A 12/1992 Hirakawa
7,940,478 B2 * 5/2011 Take .............................. 359/794

FOREIGN PATENT DOCUMENTS

JP 63-061214 3/1988
JP 03-200909 9/1991

* cited by examiner

*Primary Examiner* — Jack Dinh
(74) *Attorney, Agent, or Firm* — Rader, Fishman & Grauer PLLC

(57) ABSTRACT

An image pickup lens includes: a first lens group including a single negative lens and a single positive lens disposed in order from the object side to the image side and having a positive refracting power; and a second lens group having a positive refracting power. The first and second lens groups are disposed in order from the object side to the image side. The first lens group is fixed, when the image pickup object distance varies from the infinity to the proximity, with respect to an image surface while the second lens group is moved from the image side to the object side to carry out focusing.

10 Claims, 13 Drawing Sheets

IMAGE PICKUP LENS AND IMAGE PICKUP APPARATUS

BACKGROUND OF THE INVENTION

1. Field of the Invention

This invention relates to an image pickup lens and an image pickup apparatus. Specifically, the present invention relates to a technical field of a large aperture single focus lens as an image pickup lens which has an F number of approximately 1.2 to 1.5 and an angle of view of approximately 46 degrees and can be used suitably with a camera with an interchangeable lens, a video camera, a digital still camera, a broadcasting camera and so forth and an image pickup apparatus which includes a large aperture single focus lens.

2. Description of the Related Art

A large aperture lens having an F number of approximately 1.2 to 1.5 is used as an image pickup lens. Most of such large aperture lenses have a double Gauss configuration wherein two combinations of a concave lens and a convex lens are disposed in an opposing symmetrical relationship with each other. Since such large aperture lenses use full extension type focusing, most of them exhibit significant deterioration of an image formation performance upon short range image pickup.

Meanwhile, a retrofocus type lens which uses a floating system for moving a plurality of lens groups at different speeds upon focusing is adopted as a large aperture wide angle lens having an angle of view of approximately 64 degrees.

As an image pickup lens which uses such a floating system as just described, for example, an image pickup lens is known which is configured from a first lens group having a negative refracting power, a second lens group having a positive refracting power, and a third lens group having a positive refracting power. An image pickup lens of the type just described is disclosed, for example, in Japanese Patent Laid-Open No. Sho 63-61214 (hereinafter referred to as Patent Document 1).

The image pickup lens disclosed in Patent Document 1 is of the retrofocus type which employs the floating system, and is adopted, for example, in a large aperture wide angle lens having an angle of view of approximately 64 degrees.

The image pickup lens disclosed in Patent Document 1 uses the floating system wherein, when the image pickup object distance varies from the infinity to the proximity, the first lens group is fixed with respect to an image surface while the second lens group moves from the image side toward the object side and the third lens group moves from the image side toward the object side while varying the distance to the second lens group.

Meanwhile, as a large aperture intermediate telephoto lens of an angle of view of approximately 29 degrees, a lens is known in which a first lens group including two positive lenses and a strong negative lens having a concave face directed to the image side are disposed in order from the object side toward the image side and which has a positive refracting power, and a second lens group having a positive refracting power. A large aperture intermediate telephoto lens of the type just described is disclosed, for example, in Japanese Patent Laid-Open No. Hei 3-200909 (hereinafter referred to as Patent Document 2).

The image pickup lens disclosed in Patent Document 2 is formed as a lens of the rear focus type wherein, when the image pickup object distance varies from the infinity to the proximity, the first lens group is fixed with respect to an image surface while the second lens group moves from the image side toward the object side to carry out focusing.

SUMMARY OF THE INVENTION

However, most of large aperture standard lenses having an F number of approximately 1.2 to 1.5 and an angle of view of approximately 46 degrees still have a double Gauss type configuration, and since such large aperture lenses use full extension type focusing, most of them exhibit significant deterioration of an image formation performance upon short range image pickup.

Meanwhile, in the image pickup lens disclosed in Patent Document 1, when the image pickup object distance varies from the infinity to the proximity, the second lens group and the third lens group are moved. Therefore, the number of lens groups which move upon focusing is great.

Accordingly, it is necessary to cause the movable lens groups to make complicated movement, and this applies a load to the movable lens groups. Therefore, there is a problem that the focusing speed is lowered or increase of the cost or increase of the diameter of the lens barrel is invited.

On the other hand, in the image pickup lens disclosed in Patent Document 2, since the back focus is short with respect to the focal length, the image pickup lens is not suitable for a type of an image pickup lens which must assure a long back focus with respect to the focal length of an interchangeable lens or the like from a wide angle state to a standard state, for example, for a single-lens reflex camera.

Therefore, it is desirable to provide an image pickup lens and an image pickup apparatus which can overcome the above problems and can achieve enhancement of an optical performance over a wide range of an image pickup object distance from the infinity to the proximity and simplification of a lens barrel structure.

According to an embodiment of the present invention, there is provided an image pickup lens including a first lens group including a single negative lens and a single positive lens disposed in order from the object side to the image side and having a positive refracting power, and a second lens group having a positive refracting power, the first lens and the second lens being disposed in order from the object side to the image side, the first lens group being fixed, when the image pickup object distance varies from the infinity to the proximity, with respect to an image surface while the second lens group is moved from the image side to the object side to carry out focusing, the image pickup lens satisfying the following conditional expressions (1) to (3):

$$1.0 < f2/fi < 1.5 \tag{1}$$

$$1.1 < fi/bfi < 1.5 \tag{2}$$

$$0.7 < |f1F/f1R| < 1.3 \tag{3}$$

where
f2: focal length of the second lens group
fi: focal length of the entire lens system in an infinitely focused state
bfi: back focus of the entire lens system in the infinitely focused state
f1F: focal length of the negative lens of the first lens group
f1R: focal length of the positive lens of the first lens group.

In the image pickup lens, a back focus of an appropriate length is assured and reduction of the stroke of movement of the second lens group upon focusing is achieved. Accordingly, with the image pickup lens, improvement of an optical performance over a wide range of image pickup distance from the infinity to the proximity and simplification of the lens barrel structure can be achieved.

Preferably, the negative lens of the first lens group is configured from a concavo-concave lens, and the image pickup lens satisfies the following conditional expressions (4) and (5):

$$0.7<|R1/fi|<5 \quad (4)$$

$$0.7<|R2/fi|<1.5 \quad (5)$$

where
R1: radius of curvature of a face on the object side of the negative lens of the first lens group
R2: radius of curvature of a face on the image side of the negative lens of the first lens group.

In the image pickup lens, since the negative lens of the first lens group is configured from a concavo-concave lens and the conditional expressions (4) and (5) are satisfied, variations of various aberrations such as the curvature of field caused by variation of the image pickup object distance are suppressed. Accordingly, with the image pickup lens, the variation of the curvature of field caused by variation of the image pickup object distance can be suppressed and the diameter of the negative lens can be reduced. Consequently, both of miniaturization and enhancement in performance can be anticipated.

More preferably, the positive lens of the first lens group is configured from a convexo-convex lens, and the image pickup lens satisfies the following conditional expression (6):

$$0.6<|R2/R3|<1.5 \quad (6)$$

where
R3: radius of curvature of a face on the object side of the positive lens of the first lens group.

In the image pickup lens, since the positive lens of the first lens group is configured from a convexo-convex lens and the conditional expression (6) is satisfied, the appearance amount of a negative spherical aberration which appears at the image side face of the positive lens with respect to a positive spherical aberration which appears at the image side face of the negative lens of the first lens group is normalized. Accordingly, with the image pickup lens, enhancement of the image formation performance can be anticipated and miniaturization can be anticipated.

Preferably, the second lens group includes a lens or lenses having at least one aspheric face.

In the image pickup lens, since at least one aspheric face is formed on the lens or lenses of the second lens group, a negative spherical aberration appearing in the first lens group is corrected by the lens or lenses having the aspheric face. Since the aberration correction is carried out, the number of component lenses in the second lens group can be minimized and the weight of the second lens group can be reduced.

Preferably, the second lens group has two concave faces opposing to each other with a stop positioned therebetween.

In the image pickup lens, since the second lens group is configured such that the two concave faces oppose to each other with the stop positioned therebetween, a configuration of the double Gauss type wherein concave faces are opposed to each other with the stop interposed therebetween is established. Consequently, the spherical aberration and the curvature of field of a large aperture lens can be corrected favorably.

Preferably, the image pickup lens satisfies the following conditional expression (7):

$$0.6<vd1/vd2<0.85 \quad (7)$$

where
vd1: Abbe number of the negative lens of the first lens group with regard to the d-line
vd2: Abbe number of the positive lens of the first lens group with regard to the d-line.

In the image pickup lens, since the conditional expression (7) is satisfied, the magnification chromatic aberration and the on-axis chromatic aberration which appear in the first lens group are reduced. Accordingly, enhancement of the image formation performance can be anticipated and miniaturization can be anticipated.

According to another embodiment of the present invention, there is provide an image pickup lens including a first lens group including a single negative lens and a single positive lens disposed in order from the object side to the image side and having a positive refracting power, and a second lens group having a positive refracting power, the first lens and the second lens being disposed in order from the object side to the image side, the first lens group being fixed, when the image pickup object distance varies from the infinity to the proximity, with respect to an image surface while the second lens group is moved from the image side to the object side to carry out focusing, the negative lens of the first lens group being configured from a concavo-concave lens.

In the image pickup lens, variation of the curvature of field which is caused by a variation of the image pickup object distance is suppressed. Accordingly, with the image pickup lens, improvement of an optical performance over a wide range of image pickup distance from the infinity to the proximity and simplification of the lens barrel structure can be achieved. Further, the variation of the curvature of field caused by variation of the image pickup object distance can be suppressed.

Preferably, the second lens group has two concave faces opposing to each other with a stop positioned therebetween.

In the image pickup lens, since the second lens group is configured such that the two concave faces oppose to each other with the stop positioned therebetween, a configuration of the double Gauss type wherein concave faces are opposed to each other with the stop interposed therebetween is established. Consequently, the spherical aberration and the curvature of field of a large aperture lens can be corrected favorably.

According to a further embodiment of the present invention, there is provided an image pickup apparatus including an image pickup lens, and an image pickup element for converting an optical image formed by the image pickup lens into an electric signal, the image pickup lens including a first lens group including a single negative lens and a single positive lens disposed in order from the object side to the image side and having a positive refracting power, and a second lens group having a positive refracting power, the first lens and the second lens being disposed in order from the object side to the image side, the first lens group being fixed, when the image pickup object distance varies from the infinity to the proximity, with respect to an image surface while the second lens group is moved from the image side to the object side to carry out focusing, the image pickup lens satisfying the following conditional expressions (1) to (3):

$$1.0<f2/fi<1.5 \quad (1)$$

$$1.1<fi/bfi<1.5 \quad (2)$$

$$0.7<|f1F/f1R|<1.3 \quad (3)$$

where
f2: focal length of the second lens group
fi: focal length of the entire lens system in an infinitely focused state bfi: back focus of the entire lens system in the infinitely focused state f1F: focal length of the negative lens of the first lens group f1R: focal length of the positive lens of the first lens group.

In the image pickup apparatus, a back focus of an appropriate length is assured and reduction of the stroke of movement of the second lens group upon focusing is achieved. Accordingly, with the image pickup apparatus, improvement of an optical performance over a wide range of image pickup distance from the infinity to the proximity and simplification of the lens barrel structure can be achieved.

According to a still further embodiment of the present invention, there is provided an image pickup apparatus including an image pickup lens, and an image pickup element for converting an optical image formed by the image pickup lens into an electric signal, the image pickup lens including a first lens group including a single negative lens and a single positive lens disposed in order from the object side to the image side and having a positive refracting power, and a second lens group having a positive refracting power, the first lens and the second lens being disposed in order from the object side to the image side, the first lens group being fixed, when the image pickup object distance varies from the infinity to the proximity, with respect to an image surface while the second lens group is moved from the image side to the object side to carry out focusing, the negative lens of the first lens group being configured from a concavo-concave lens.

In the image pickup apparatus, variation of the curvature of field which is caused by a variation of the image pickup object distance is suppressed. Accordingly, with the image pickup apparatus, improvement of an optical performance over a wide range of image pickup distance from the infinity to the proximity and simplification of the lens barrel structure can be achieved. Further, the variation of the curvature of field caused by variation of the image pickup object distance can be suppressed.

The above and other features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
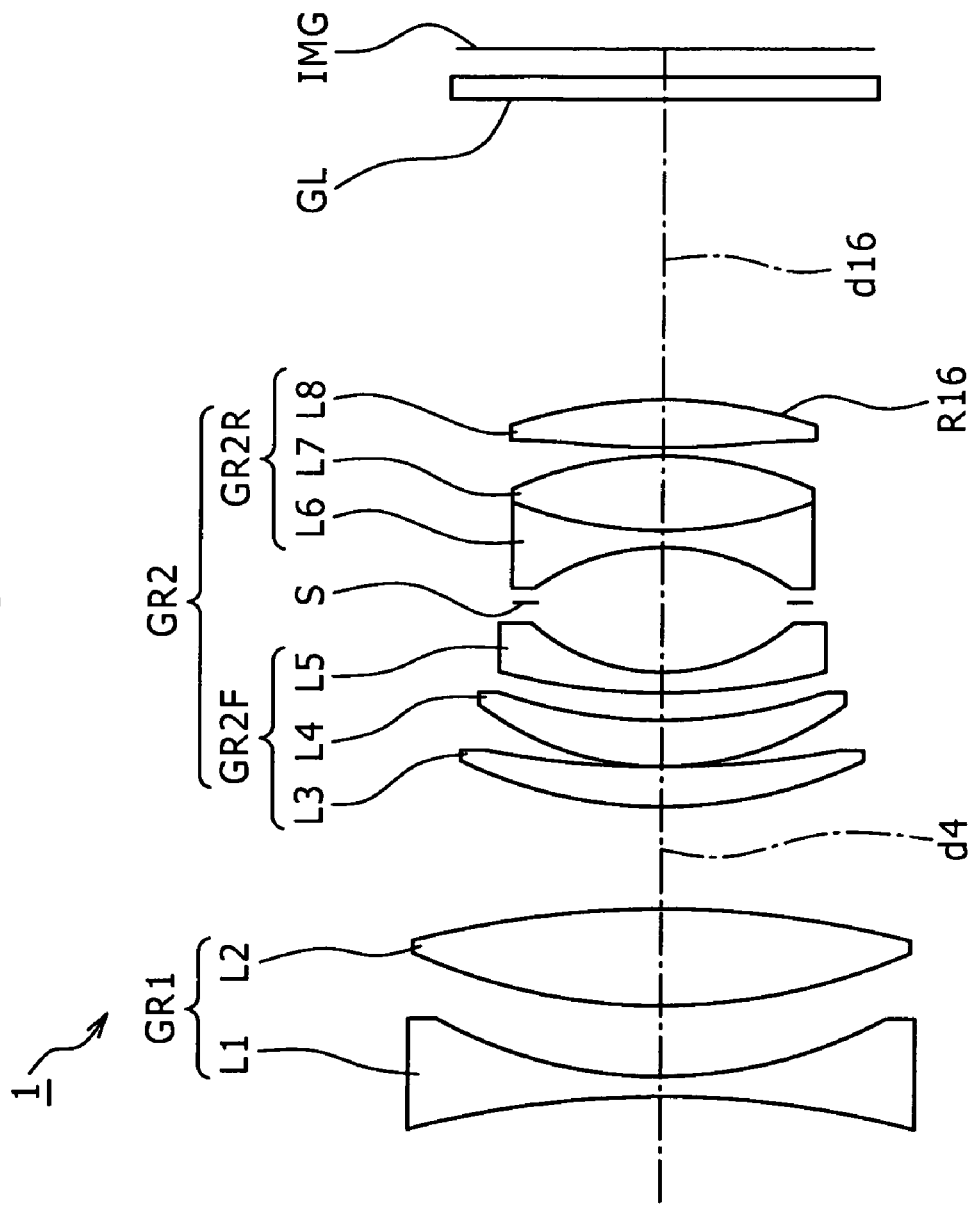
FIG. 1 is a schematic view showing a lens configuration of an image pickup lens according to a first embodiment of the present invention.

In the following, image pickup lenses and apparatus of preferred embodiments of the present invention are described with reference to the accompanying drawings.

Configuration of the Image Pickup Lens

An image pickup lens according to an embodiment of the present invention includes a first lens group including a single negative lens and a single positive lens disposed in order from the object side to the image side and having a positive refracting power, and a second lens group having a positive refracting power. The first lens and the second lens are disposed in order from the object side to the image side.

In the image pickup lens, when the image pickup object distance varies from the infinity to the proximity, the first lens group is fixed with respect to an image surface while the second lens group is moved from the image side to the object side to carry out focusing.

The image pickup lens satisfies the following conditional expressions (1) to (3):

$$1.0 < f2/fi < 1.5 \tag{1}$$

$$1.1 < fi/bfi < 1.5 \tag{2}$$

$$0.7 < |f1F/f1R| < 1.3 \tag{3}$$

where f2: focal length of the second lens group fi: focal length of the entire lens system in an infinitely focused state bfi: back focus of the entire lens system in the infinitely focused state f1F: focal length of the negative lens of the first lens group f1R: focal length of the positive lens of the first lens group.

Since the image pickup lens is configured in such a manner as described above and satisfies the conditional expressions (1) to (3) given above, improvement of an optical performance over a wide range of image pickup distance from the infinity to the proximity and simplification of the lens barrel structure can be achieved.

Particularly, the image pickup lens can be used as a large aperture single focus lens which has an F number of approximately 1.2 to 1.5 and an angle of view of approximately 46 degrees and is superior in optical performance over a wide range of image pickup distance from the infinity to the proximity and allows simplification of the lens barrel structure.

The conditional expression (1) defines the focal length of the second lens group.

If the focal length of the second lens group becomes smaller than the lower limit of the conditional expression (1), then it becomes impossible to sufficiently assure the back focus and the variation of the spherical aberration with respect to the variation of the image pickup object distance becomes great, resulting in deterioration of the image formation performance in a proximity region.

On the contrary, if the focal length of the second lens group becomes greater than the upper limit of the conditional expression (1), then the stroke of movement of the second lens group upon focusing becomes great. Consequently, the focusing speed becomes lower and it becomes difficult to achieve reduction of the overall length of the image pickup lens.

Accordingly, where the image pickup lens satisfies the conditional expression (1), the back focus can be elongated and it becomes possible to suppress the variation of the spherical aberration with respect to the variation of the image pickup object distance. Further, the stroke of movement of the second lens group upon focusing can be decreased and increase of the focusing speed and reduction of the overall length can be anticipated.

The conditional expression (2) defines the amount of the back focus with respect to the focal length.

If the amount of the back focus becomes smaller than the lower limit of the conditional expression (2), then the back focus becomes short, and the image pickup lens becomes inappropriate, for example, as an interchangeable lens for a single-lens reflex camera.

On the contrary, if the amount of the back focus becomes greater than the upper limit of the conditional expression (2), then it becomes necessary to increase the back focus of the second lens group and becomes necessary to configure the second lens group from that of the retrofocus type. Consequently, the image formation performance in a proximity region is deteriorated.

Accordingly, if the image pickup lens satisfies the conditional expression (2), then it becomes possible to elongate the back focus and enhancement of the image formation performance in a proximity region can be anticipated.

The conditional expression (3) defines the ratio between the focal length of the negative lens and the focal length of the positive lens in the first lens group.

If the ratio between the focal lengths becomes lower than the lower limit of the conditional expression (3), then the refracting power of the negative lens in the first lens group becomes excessively high, and the stroke of movement of the second lens group upon focusing becomes great. Consequently, the focusing speed becomes low and it becomes difficult to reduce the overall length.

On the contrary, if the ratio between the focal lengths becomes higher than the upper limit of the conditional expression (3), then the back focus becomes short and the diameter of the negative lens of the first lens group becomes great. This makes an obstacle to miniaturization.

Accordingly, if the image pickup lens satisfies the conditional expression (3), then the stroke of movement of the second lens group upon focusing can be reduced and it is possible to increase the focusing speed and reduce the overall length. Further, it is possible to increase the back focus and achieve miniaturization.

It is to be noted that the conditional expression (3) is modified more preferably such that the lower limit is set to 0.85 and the upper limit is set to 1.15.

Preferably, the negative lens of the first lens group is configured from a concavo-concave lens, and the image pickup lens satisfies the following conditional expressions (4) and (5):

$$0.7<|R1/fi|<5 \quad (4)$$

$$0.7<|R2/fi|<1.5 \quad (5)$$

where
R1: radius of curvature of a face on the object side of the negative lens of the first lens group
R2: radius of curvature of a face on the image side of the negative lens of the first lens group.

Where the object side face of the negative lens of the first lens group is formed as a concave face directed to the object side, the variation of the curvature of field caused by a variation of the image pickup object distance can be suppressed.

Further, where the negative lens of the first lens group is configured from a concavo-concave lens and the conditional expressions (4) and (5) are satisfied, the diameter of the negative lens can be reduced and both of miniaturization and enhancement in performance can be anticipated.

The conditional expression (4) defines the radius of curvature of the object side face of the negative lens of the first lens group.

If the radius of curvature becomes smaller than the lower limit of the conditional expression (4), then the refracting power of the object side face of the negative lens of the first lens group becomes excessively high, resulting in increase in negative distortion.

On the contrary, if the radius of curvature of the object side face of the negative lens of the first lens group becomes greater than the upper limit of the conditional expression (4), then the refracting power of the object side face of the negative lens of the first lens group becomes excessively low. Consequently, the diameter of the negative lens of the first lens group becomes great, and therefore, miniaturization cannot be anticipated.

Accordingly, if the image pickup lens satisfies the conditional expression (4), then it is possible to suppress appearance of negative distortion and achieve miniaturization.

The conditional expression (5) defines the radius of curvature of the image side face of the negative lens of the first lens group.

If the radius of curvature becomes smaller than the lower limit of the conditional expression (5), then a negative comatic aberration which appears at the image side face of the negative lens of the first lens group becomes great, resulting in deterioration of the image formation performance.

On the contrary, if the radius of curvature of the image side face of the negative lens of the first lens group becomes greater than the upper limit of the conditional expression (5), then the positive spherical aberration which occurs at the image side face of the negative lens of the first lens group becomes small while the variation of the spherical aberration upon proximity image pickup becomes great.

Accordingly, if the image pickup lens satisfies the conditional expression (5), then it is possible to achieve enhancement of the image formation performance and reduce the variation of the spherical aberration upon proximity image pickup.

It is to be noted that the conditional expression (5) is modified more preferably such that the lower limit is set to 0.85 and the upper limit is set to 1.2.

More preferably, the positive lens of the first lens group is configured from a convexo-convex lens, and the image pickup lens satisfies the following conditional expression (6):

$$0.6 < |R2/R3| < 1.5 \qquad (6)$$

where

R3: radius of curvature of a face on the object side of the positive lens of the first lens group.

Where the positive lens of the first lens group is configured from a convexo-convex lens and the conditional expression (6) is satisfied, miniaturization of the image pickup lens can be anticipated.

The conditional expression (6) defines the ratio between the radius of curvature of the image side face of the negative lens and the radius of curvature of the object side face of the positive lens in the first lens group.

If the ratio between the radii of curvature becomes lower than the lower limit of the conditional expression (6), then the positive spherical aberration which appears at the image side face of the negative lens of the first lens group becomes excessively great in comparison with the negative spherical aberration which appears at the object side face of the positive lens. Consequently, the negative spherical aberration which appears in the entire first lens group becomes great, resulting in deterioration in image formation performance.

On the contrary, if the ratio between the radii of curvature described above becomes higher than the upper limit of the conditional expression (6), then the positive spherical aberration which appears at the image side face of the negative lens of the first lens group becomes small in comparison with the negative spherical aberration which appears at the object side face of the positive lens. Consequently, it becomes necessary to increase the distance between the negative lens and the positive lens in order to assure a performance upon proximity image pickup. Consequently, the overall length of the image pickup lens becomes great and the diameter of the negative lens becomes great.

Accordingly, if the image pickup lens satisfies the conditional expression (6), then enhancement of the image formation performance can be anticipated and miniaturization can be anticipated.

It is to be noted that the conditional expression (6) is modified more preferably such that the lower limit is set to 0.65 and the upper limit is set to 1.0.

Preferably, the image pickup lens satisfies the following conditional expression (7):

$$0.6 < vd1/vd2 < 0.85 \qquad (7)$$

where vd1: Abbe number of the negative lens of the first lens group with regard to the d-line vd2: Abbe number of the positive lens of the first lens group with regard to the d-line.

The conditional expression (7) defines the ratio between the Abbe number of the negative lens with regard to the d-line and the Abbe number of the positive lens with regard to the d-line in the first lens group.

If the ratio between the Abbe numbers becomes lower than the lower limit of the conditional expression (7), then the magnification chromatic aberration which appears in the first lens group becomes excessively great, and it becomes difficult for the second lens group to correct the remaining aberration.

On the contrary, if the ratio between the Abbe numbers becomes higher than the upper limit of the conditional expression (7), then the on-axis chromatic aberration which appears in the first lens group becomes excessively great, and it becomes difficult for the second lens group to correct the remaining aberration.

Accordingly, if the image pickup lens satisfies the conditional expression (7), then appearance of the on-axis chromatic aberration and the magnification chromatic aberration in the first lens group can be suppressed.

Preferably, the second lens group includes a lens or lenses having at least one aspheric face.

Because a strong negative spherical aberration appears in the first lens group, where at least one aspheric face is formed on the lens or lenses of the second lens group to carry out aberration correction, the number of component lenses in the second lens group can be minimized and the weight of the second lens group which functions as a focusing group can be reduced.

Preferably, the second lens group has two concave faces opposing to each other with a stop positioned therebetween.

Since the second lens group is configured such that the two concave faces oppose to each other with the stop positioned therebetween and particularly has a configuration of the double Gauss type wherein concave faces are opposed to each other with the stop interposed therebetween, appearance of various aberrations in the second lens group can be suppressed.

According to another embodiment of the present invention, the image pickup lens includes a first lens group including a single negative lens and a single positive lens disposed in order from the object side to the image side and having a positive refracting power, and a second lens group having a positive refracting power, the first lens and the second lens being disposed in order from the object side to the image side.

In the image pickup lens, when the image pickup object distance varies from the infinity to the proximity, the first lens group is fixed with respect to an image surface while the second lens group is moved from the image side to the object side to carry out focusing. The negative lens of the first lens group is configured from a concavo-concave lens.

In the image pickup lens, since it is configured in such a manner as described above, improvement of an optical performance over a wide range of image pickup distance from the infinity to the proximity and simplification of the lens barrel structure can be achieved. Further, the variation of the curvature of field caused by variation of the image pickup object distance can be suppressed.

Particularly, the image pickup lens can be used as a large aperture single focus lens which has an F number of approximately 1.2 to 1.5 and an angle of view of approximately 46 degrees and is superior in optical performance over a wide range of image pickup distance from the infinity to the proximity and allows simplification of the lens barrel structure.

Preferably, the second lens group has two concave faces opposing to each other with a stop positioned therebetween.

Since the second lens group is configured such that the two concave faces oppose to each other with the stop positioned therebetween and particularly has a configuration of the double Gauss type wherein concave faces are opposed to each other with the stop interposed therebetween, appearance of various aberrations in the second lens group can be suppressed.

Numerical Value Examples of the Image Pickup Lens

In the following, image pickup lenses according to particular embodiments of the present invention and numerical value examples applied to the embodiments are described with reference to the accompanying drawings and tables.

It is to be noted that characters used in the tables and the following descriptions are such as follows:

"i" represents the face number; "Ri" the radius of curvature; "di" the on-axis face distance between the ith face and the i+1th face; "nd" the refracting power; "vi" the Abbe number; "FNo." the F number; "f" the focal length; and "ω" the half angle of view. In regard to the face number, "ASP" represents that the face is aspheric, and in regard to the radius of curvature, "∞" represents that the face is a flat face. Further, as regards the on-axis face distance, variable distances in each table are indicated in order of that "in an infinitely focused state" and that "in a proximately focused state."

Further, the refractive indexes and the Abbe numbers are those with regard to the d-line (λ=587.6 nm).

The lenses used in the numerical value examples include some lens having an aspheric lens face. Where the distance from the apex of the lens face in the direction of the optical axis, that is, the sag amount, is represented by x; the height, that is, the image height, in a direction perpendicular to the direction of the optical axis by "y"; the paraxial radius of curvature at the apex of the lens, that is, the reciprocal of the radius of curvature, by "c"; the conic constant by "κ"; and the fourth, sixth, eighth and tenth-order aspheric coefficients are represented by "C4," "C6," "C8" and "C10," respectively, the aspheric shape is defined by the following expression 1:

$$x = \frac{cy^2}{1 + \sqrt{1 - (1+\kappa)c^2 y^2}} + C4 \cdot y^4 + C6 \cdot y^6 + C8 \cdot y^8 + C10 \cdot y^{10}$$

Expression 1

First Embodiment

FIG. 1 shows a lens configuration of an image pickup lens 1 according to a first embodiment of the present invention.

Referring to FIG. 1, the image pickup lens 1 includes a first lens group GR1 having a positive refracting power and a second lens group GR2 having a positive refracting power. The first lens group GR1 and the second lens group GR2 are disposed in order from the object side toward the image side.

In the image pickup lens 1, when the image pickup object distance varies from the infinity to the proximity, the first lens group GR1 is fixed with respect to an image surface while the second lens group GR2 moves from the image side toward the object side to carry out focusing.

The first lens group GR1 includes a first lens L1 in the form of a concavo-concave lens having a negative refracting power, and a second lens L2 in the form of a convexo-convex lens having a positive refracting power. The first lens L1 and the second lens L2 are disposed in order from the object side toward the image side.

The second lens group GR2 includes a front group GR2F disposed on the object side with respect to a stop S and a rear group GR2R disposed on the image side with respect to the stop S.

The front group GR2F includes a third lens L3 in the form of a meniscus lens convex to the object side and having a positive refracting power, a fourth lens L4 in the form of a meniscus lens convex to the object side and having a positive refracting power, and a fifth lens L5 in the form of a meniscus lens convex to the object side and having a negative refracting power. The third lens L3, fourth lens L4 and fifth lens L5 are disposed in order from the object side to the image side.

The rear group GR2R includes a sixth lens L6 in the form of a concavo-concave lens having a negative refracting power, a seventh lens L7 in the form of a convexo-convex lens having a positive refracting power, and an eighth lens L8 in the form of a convexo-convex lens having a positive refracting power. The sixth lens L6, seventh lens L7 and eighth lens L8 are disposed in order from the object side toward the image side. The sixth lens L6 and the seventh lens L7 are configured as a cemented lens.

A parallel glass plate GL configured from a kind of filter is disposed between the eighth lens L8 and the image surface IMG. The back focus is a distance from an image side face of the eighth lens L8 to the image surface IMG where the parallel glass plate GL is converted into the air.

Table 1 indicates lens data of a numerical value example 1 where particular numerical values are applied to the image pickup lens 1 of the first embodiment.

TABLE 1

| i | Ri | di | nd | vd |
|---|---|---|---|---|
| 1 | −94.569 | 2.000 | 1.64769 | 33.84 |
| 2 | 50.393 | 7.692 | | |
| 3 | 63.750 | 10.162 | 1.80420 | 46.50 |
| 4 | −100.274 | 11.243~1.218 | | |
| 5 | 49.146 | 4.224 | 1.90366 | 31.32 |
| 6 | 108.076 | 0.200 | | |
| 7 | 32.136 | 4.834 | 1.77250 | 49.62 |
| 8 | 55.051 | 3.030 | | |
| 9 | 76.559 | 1.900 | 1.67270 | 32.17 |
| 10 | 21.711 | 7.500 | | |
| 11 | ∞ | 5.860 | | |
| 12 | −23.151 | 1.800 | 1.72825 | 28.32 |
| 13 | 46.466 | 8.000 | 1.72916 | 54.67 |
| 14 | −37.270 | 1.007 | | |
| 15 | 177.747 | 5.000 | 1.80610 | 40.88 |
| 16 | −45.545(ASP) | 32.600~42.625 | | |
| 17 | ∞ | 2.000 | 1.51680 | 64.20 |
| 18 | ∞ | | | |

FNo. = 1.442, f = 49.98, ω = 23.73°.

In the image pickup lens 1, an image side face of the eighth lens L8 of the second lens group GR2, that is, the 16th face, is formed as an aspheric face. The fourth-, sixth-, eighth- and tenth-order aspheric face coefficients C4, C6, C8 and C10 of the aspheric face in the numerical value example 1 are indicated in Table 2 together with the conic constant κ.

It is to be noted that, in Table 2 and the tables hereinafter described which indicate an aspheric coefficient, "E-i" is an exponential expression wherein the base is 10, that is, "$10^{-i}$," and for example, "0.12345E−05" represents "$0.12345 \times 10^{-5}$."

TABLE 2

| i | K | C4 | C6 | C8 | C10 |
|---|---|---|---|---|---|
| 16 | 0.000000 | 0.262946E−05 | −0.374929E−08 | 0.164030E−10 | −0.265065E−13 |

Figure 2:
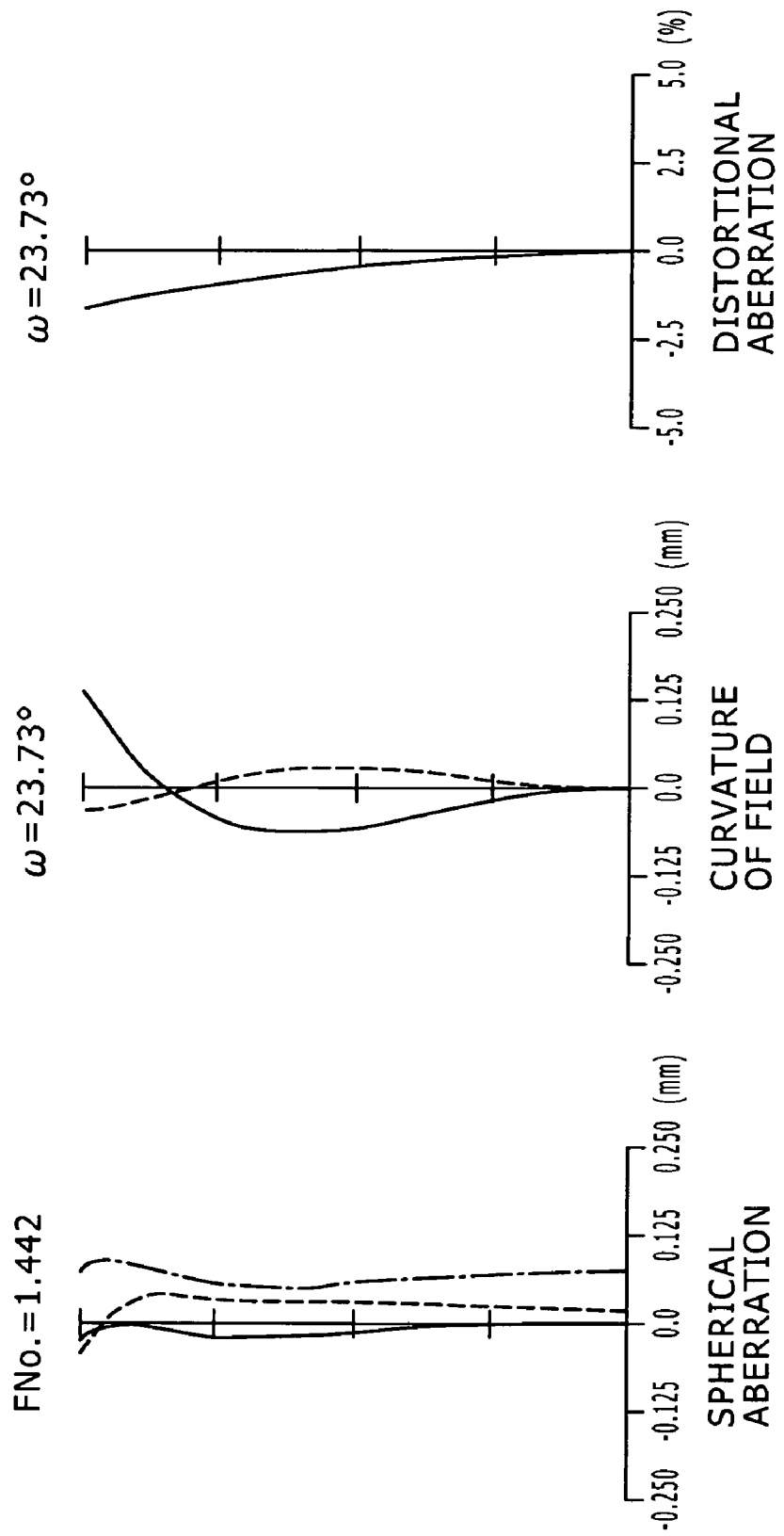
FIG. 2 is a diagrammatic view illustrating a spherical aberration, a curvature of field and a distortional aberration in an infinitely focused state of the image pickup lens of FIG. 1 according to a numerical value example wherein particular numerical values are applied to the image pickup lens.
Figure 3:
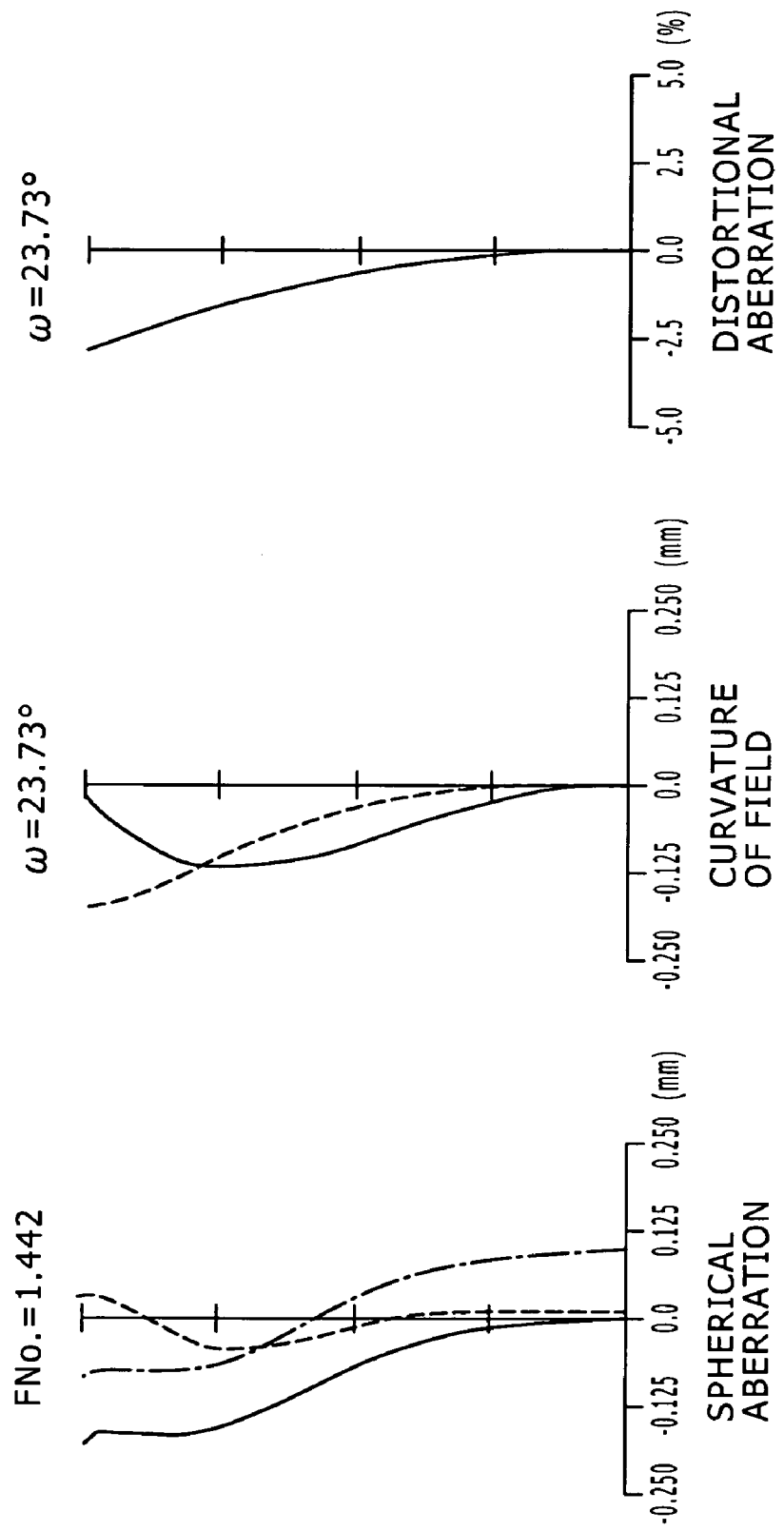
FIG. 3 is a similar view but illustrating a spherical aberration, a curvature of field and a distortional aberration in a proximately focused state of the image pickup lens of FIG. 1 according to the same numerical value example.

FIGS. 2 and 3 illustrate several aberrations in an infinitely focused state of the numerical value example 1. More particularly, FIG. 2 indicates the aberrations in an infinitely focused state, and FIG. 3 indicates the aberrations in a proximately focused state.

Referring to FIGS. 2 and 3, in the views of the spherical aberration, the axis of ordinate indicates the ratio of the spherical aberration to the open F value and the axis of abscissa indicates the focus. Further, a solid line indicates the spherical aberration with regard to the d-line (wavelength 587.6 nm); a broken line indicates the spherical aberration with regard to the g-line (wavelength 435.8 nm); and an alternate long and short dash line indicates the spherical aberration with regard to the C-line (wavelength 656.3 nm). In the views of the curvature of field, the axis of ordinate indicates the angle of view and the axis of abscissa indicates the focus. Further, a solid line indicates values of the angle of view on a sagittal image surface while a broken line indicates values of the curvature of field on a meridional image surface. In the views of the distortional aberration, the axis of ordinate indicates the angle of view and the axis of abscissa indicates the ratio.

From the views of the aberrations, it can be recognized apparently that the numerical value example 1 has a superior image formation performance with the aberrations corrected favorably.

Second Embodiment

Figure 4:
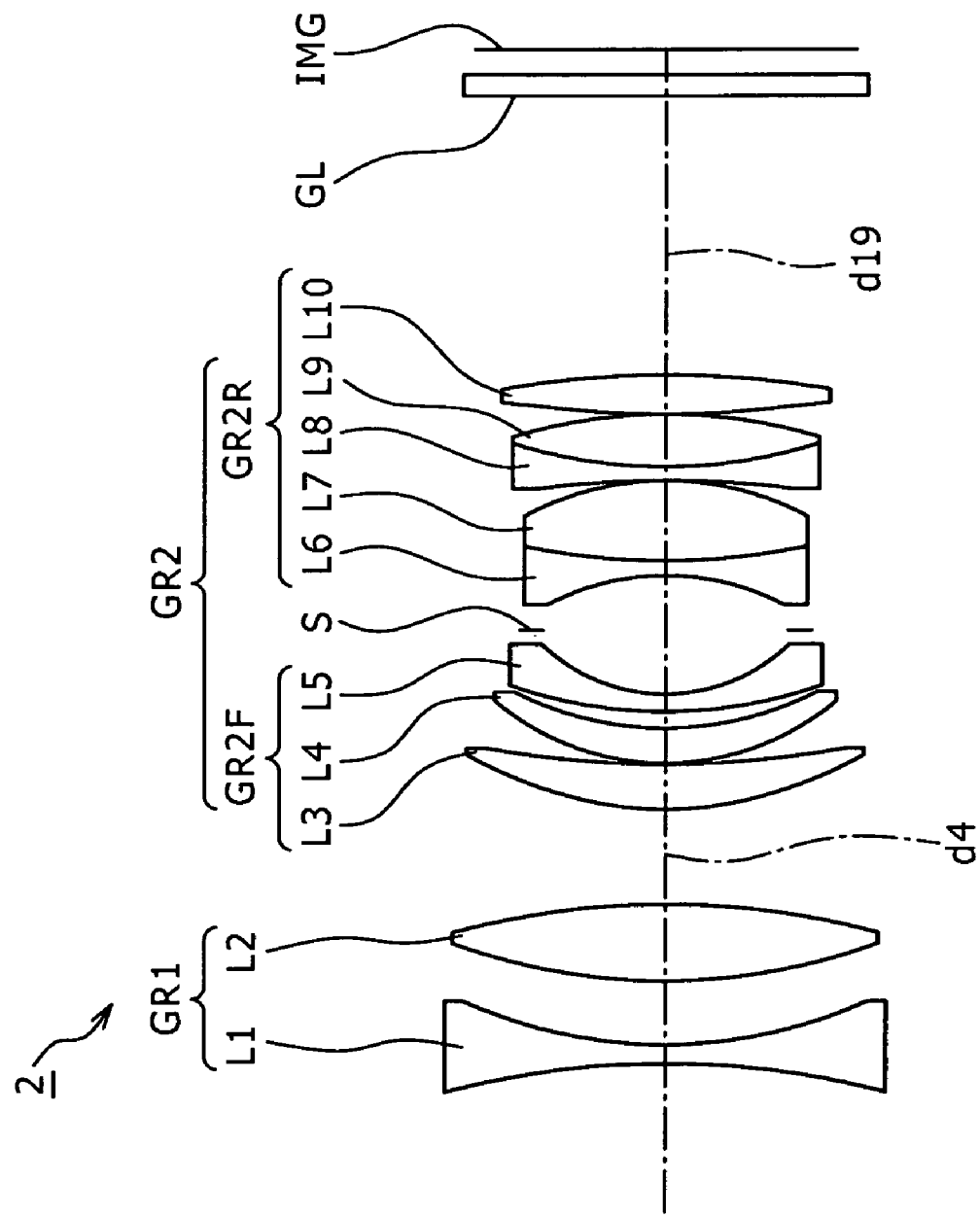
FIG. 4 is a schematic view showing a lens configuration of an image pickup lens according to a second embodiment of the present invention.

FIG. 4 shows a lens configuration of an image pickup lens 2 according to a second embodiment of the present invention.

Referring to FIG. 4, the image pickup lens 2 includes a first lens group GR1 having a positive refracting power and a second lens group GR2 having a positive refracting power. The first lens group GR1 and the second lens group GR2 are disposed in order from the object side toward the image side.

In the image pickup lens 2, when the image pickup object distance varies from the infinity to the proximity, the first lens group GR1 is fixed with respect to an image surface while the second lens group GR2 moves from the image side toward the object side to carry out focusing.

The first lens group GR1 includes a first lens L1 in the form of a concavo-concave lens and having a negative refracting power, and a second lens L2 in the form of a convexo-convex lens having a positive refracting power. The first lens L1 and the second lens L2 are disposed in order from the object side toward the image side.

The second lens group GR2 includes a front group GR2F disposed on the object side with respect to a stop S and a rear group GR2R disposed on the image side with respect to the stop S.

The front group GR2F includes a third lens L3 in the form of a meniscus lens convex to the object side and having a positive refracting power, a fourth lens L4 in the form of a meniscus lens convex to the object side and having a positive refracting power, and a fifth lens L5 in the form of a meniscus lens convex to the object side and having a negative refracting power. The third lens L3, fourth lens L4 and fifth lens L5 are disposed in order from the object side to the image side.

The rear group GR2R includes a sixth lens L6 in the form of a concavo-concave lens having a negative refracting power, a seventh lens L7 in the form of a convexo-convex lens having a positive refracting power, and an eighth lens L8 in the form of a convexo-convex lens having a negative refracting power. The rear group GR2R further includes a ninth lens L9 in the form of a convexo-convex lens having a positive refracting power, and a tenth lens L10 in the form of a convexo-convex lens having a positive refracting power. The sixth lens L6, seventh lens L7, eighth lens L8, ninth lens L9 and tenth lens L10 are disposed in order from the object side toward the image side. The sixth lens L6 and the seventh lens L7 are configured as a cemented lens, and the eighth lens L8 and the ninth lens L9 are configured as another cemented lens.

A parallel glass plate GL configured from a kind of filter is disposed between the tenth lens L10 and the image surface IMG. The back focus is a distance from an image side face of the tenth lens L10 to the image surface IMG where the parallel glass plate GL is converted into the air.

Table 3 indicates lens data of a numerical value example 2 where particular numerical values are applied to the image pickup lens 2 of the second embodiment.

TABLE 3

| i | Ri | di | nd | vd |
|---|---|---|---|---|
| 1 | −92.300 | 2.000 | 1.69895 | 30.05 |
| 2 | 53.615 | 7.630 | | |
| 3 | 70.647 | 8.921 | 1.83481 | 42.72 |
| 4 | −89.098 | 10.905~1.0 | | |
| 5 | 44.445 | 5.043 | 1.90366 | 31.32 |
| 6 | 113.586 | 0.200 | | |
| 7 | 29.801 | 4.099 | 1.90366 | 31.32 |
| 8 | 37.681 | 2.064 | | |
| 9 | 54.331 | 1.900 | 1.69895 | 30.05 |
| 10 | 21.620 | 7.444 | | |
| 11 | ∞ | 6.369 | | |
| 12 | −27.739 | 1.800 | 1.84666 | 23.78 |
| 13 | 75.595 | 8.706 | 1.61800 | 63.40 |
| 14 | −35.249 | 0.200 | | |
| 15 | −176.945 | 2.000 | 1.84666 | 23.78 |
| 16 | 66.570 | 6.000 | 1.90366 | 31.32 |
| 17 | −62.619 | 0.200 | | |
| 18 | 154.780 | 4.404 | 1.90366 | 31.32 |
| 19 | −145.378 | 32.6~42.505 | | |
| 20 | ∞ | 2.000 | 1.51680 | 64.20 |
| 21 | ∞ | | | |

FNo. = 1.443, f = 51.54, ω = 23.17°.

Figure 5:
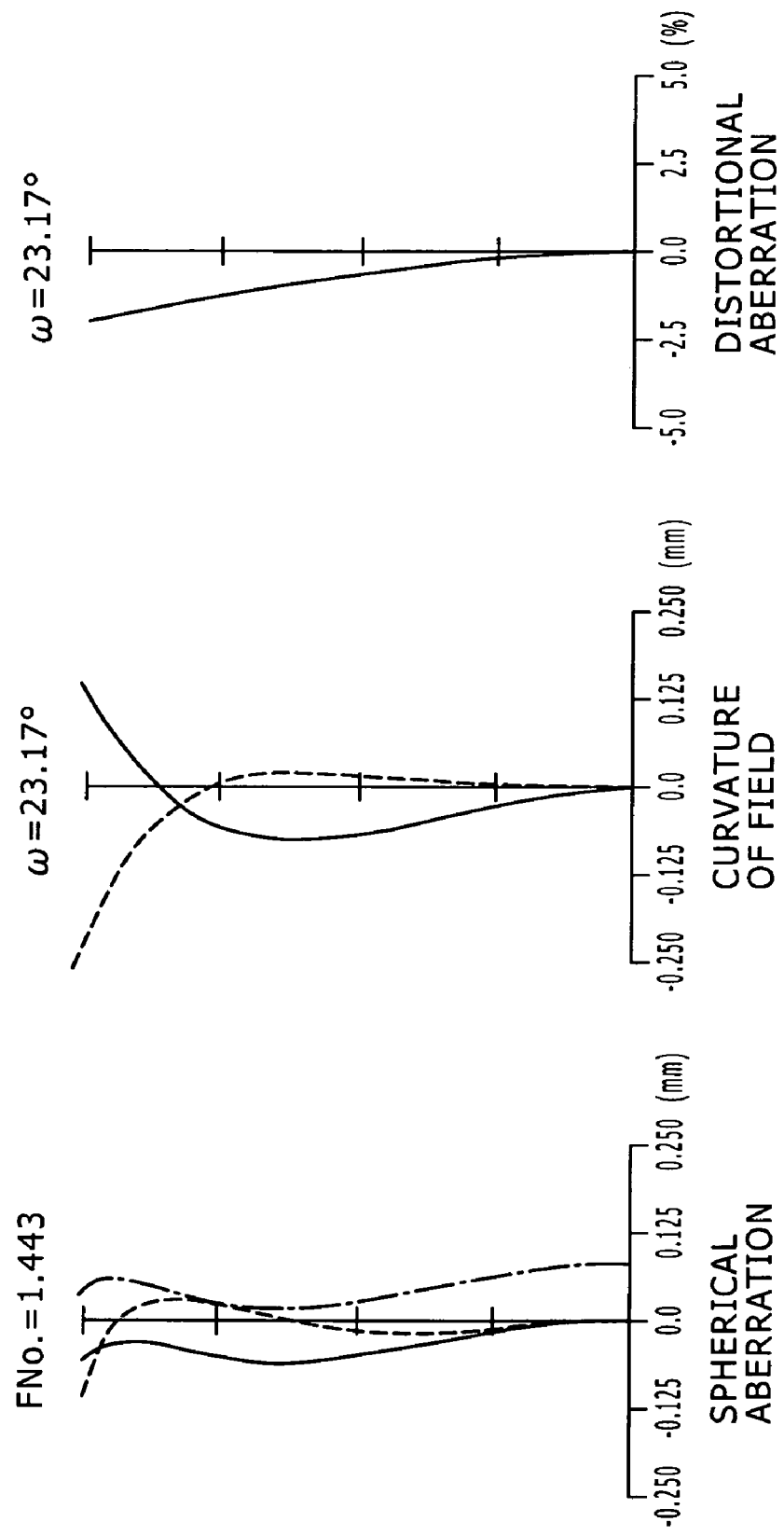
FIG. 5 is a diagrammatic view illustrating a spherical aberration, a curvature of field and a distortional aberration in an infinitely focused state of the image pickup lens of FIG. 4 according to another numerical value example wherein particular numerical values are applied to the image pickup lens.
Figure 6:
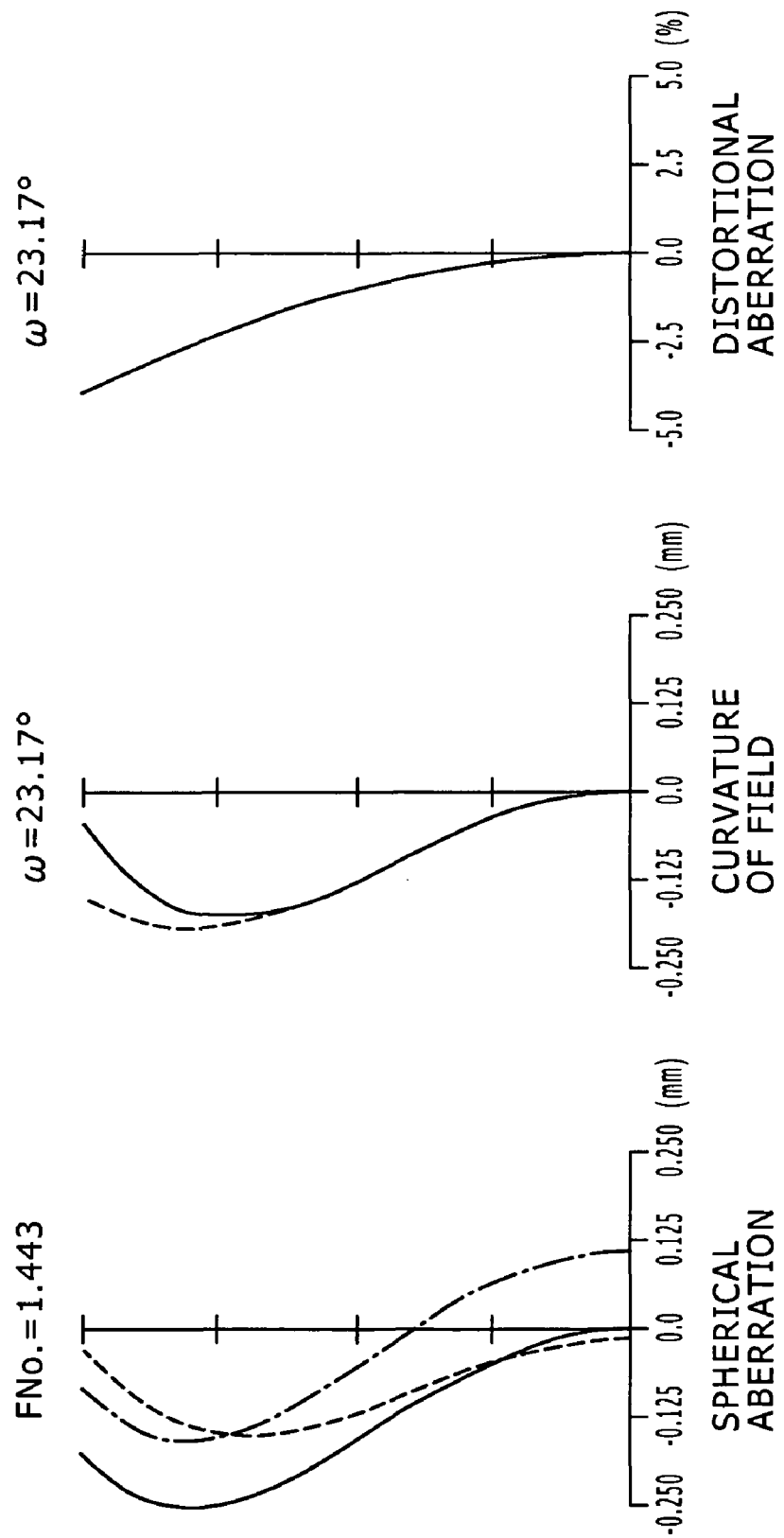
FIG. 6 is a similar view but illustrating a spherical aberration, a curvature of field and a distortional aberration in a proximately focused state of the image pickup lens of FIG. 4 according to the same numerical value example.

FIGS. 5 and 6 illustrate several aberrations in an infinitely focused state of the numerical value example 2. More particularly, FIG. 5 illustrates the aberrations in an infinitely focused state, and FIG. 6 illustrates the aberrations in a proximately focused state.

Referring to FIGS. 5 and 6, in the views of the spherical aberration, the axis of ordinate indicates the ratio of the spherical aberration to the open F value and the axis of abscissa indicates the focus. Further, a solid line indicates the spherical aberration with regard to the d-line (wavelength 587.6 nm); a broken line indicates the spherical aberration with regard to the g-line (wavelength 435.8 nm); and an alternate long and short dash line indicates the spherical aberration with regard to the C-line (wavelength 656.3 nm). In the views of the curvature of field, the axis of ordinate indicates the angle of view and the axis of abscissa indicates the focus. Further, a solid line indicates values of the angle of view on a sagittal image surface while a broken line indicates values of the curvature of field on a meridional image surface. In the views of the distortional aberration, the axis of ordinate indicates the angle of view and the axis of abscissa indicates the ratio.

From the views of the aberrations, it can be recognized apparently that the numerical value example 2 has a superior image formation performance with the aberrations corrected favorably.

Third Embodiment

Figure 7:
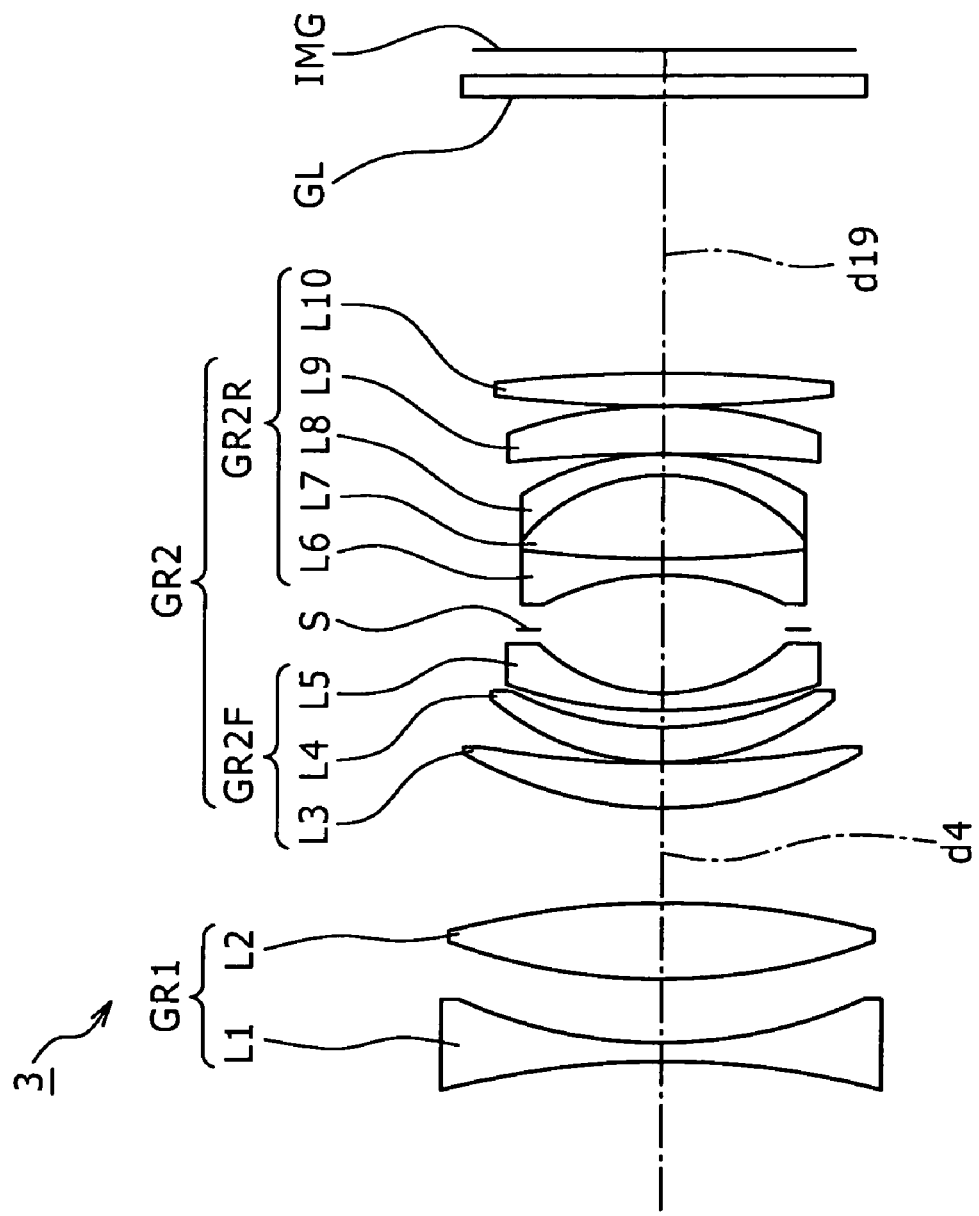
FIG. 7 is a schematic view showing a lens configuration of an image pickup lens according to a third embodiment of the present invention.

FIG. 7 shows a lens configuration of an image pickup lens 3 according to a third embodiment of the present invention.

Referring to FIG. 7, the image pickup lens 3 includes a first lens group GR1 having a positive refracting power and a second lens group GR2 having a positive refracting power. The first lens group GR1 and the second lens group GR2 are disposed in order from the object side toward the image side.

In the image pickup lens 3, when the image pickup object distance varies from the infinity to the proximity, the first lens group GR1 is fixed with respect to an image surface while the second lens group GR2 moves from the image side toward the object side to carry out focusing.

The first lens group GR1 includes a first lens L1 in the form of a concavo-concave lens and having a negative refracting power, and a second lens L2 in the form of a convexo-convex lens having a positive refracting power. The first lens L1 and the second lens L2 are disposed in order from the object side toward the image side.

The second lens group GR2 includes a front group GR2F disposed on the object side with respect to a stop S and a rear group GR2R disposed on the image side with respect to the stop S.

The front group GR2F includes a third lens L3 in the form of a meniscus lens convex to the object side and having a positive refracting power, a fourth lens L4 in the form of a meniscus lens convex to the object side and having a positive refracting power, and a fifth lens L5 in the form of a meniscus lens convex to the object side and having a negative refracting power. The third lens L3, fourth lens L4 and fifth lens L5 are disposed in order from the object side to the image side.

The rear group GR2R includes a sixth lens L6 in the form of a concavo-concave lens and having a negative refracting power, a seventh lens L7 in the form of a convexo-convex lens and having a positive refracting power, and an eighth lens L8 in the form of a meniscus lens convex to the image side and having a negative refracting power. The rear group GR2R further includes a ninth lens L9 in the form of a meniscus lens convex to the image side and having a positive refracting power, and a tenth lens L10 in the form of a convexo-convex lens having a positive refracting power. The sixth lens L6, seventh lens L7, eighth lens L8, ninth lens L9 and tenth lens L10 are disposed in order from the object side toward the image side. The sixth lens L6, seventh lens L7 and eighth lens L8 are configured as a cemented lens.

A parallel glass plate GL configured from a kind of filter is disposed between the tenth lens L10 and the image surface IMG. The back focus is a distance from an image side face of the tenth lens L10 to the image surface IMG where the parallel glass plate GL is converted into the air.

Table 4 indicates lens data of a numerical value example 3 where particular numerical values are applied to the image pickup lens 3 of the third embodiment.

TABLE 4

| i | Ri | di | nd | vd |
|---|---|---|---|---|
| 1 | −92.182 | 2.000 | 1.69895 | 30.05 |
| 2 | 53.861 | 7.500 | | |
| 3 | 70.104 | 8.902 | 1.83481 | 42.72 |
| 4 | −90.662 | 10.855~1.0 | | |
| 5 | 42.149 | 5.189 | 1.90366 | 31.32 |
| 6 | 104.829 | 0.200 | | |
| 7 | 28.679 | 4.000 | 1.90366 | 31.32 |
| 8 | 34.730 | 1.717 | | |
| 9 | 47.625 | 1.900 | 1.69895 | 30.05 |
| 10 | 20.508 | 7.736 | | |
| 11 | ∞ | 6.364 | | |
| 12 | −27.699 | 1.800 | 1.75211 | 25.05 |
| 13 | 84.671 | 10.000 | 1.61800 | 63.40 |
| 14 | −21.121 | 2.000 | 1.84666 | 23.78 |

TABLE 4-continued

| i | Ri | di | nd | vd |
|---|---|---|---|---|
| 15 | −33.695 | 0.200 | | |
| 16 | −192.166 | 5.536 | 1.90366 | 31.32 |
| 17 | −57.259 | 0.200 | | |
| 18 | 141.342 | 3.783 | 1.90366 | 31.32 |
| 19 | −247.927 | 32.6~42.455 | | |
| 20 | ∞ | 2.000 | 1.51680 | 64.20 |
| 21 | ∞ | | | |

FNo. = 1.443, f = 51.53, ω = 23.20°.

Figure 8:
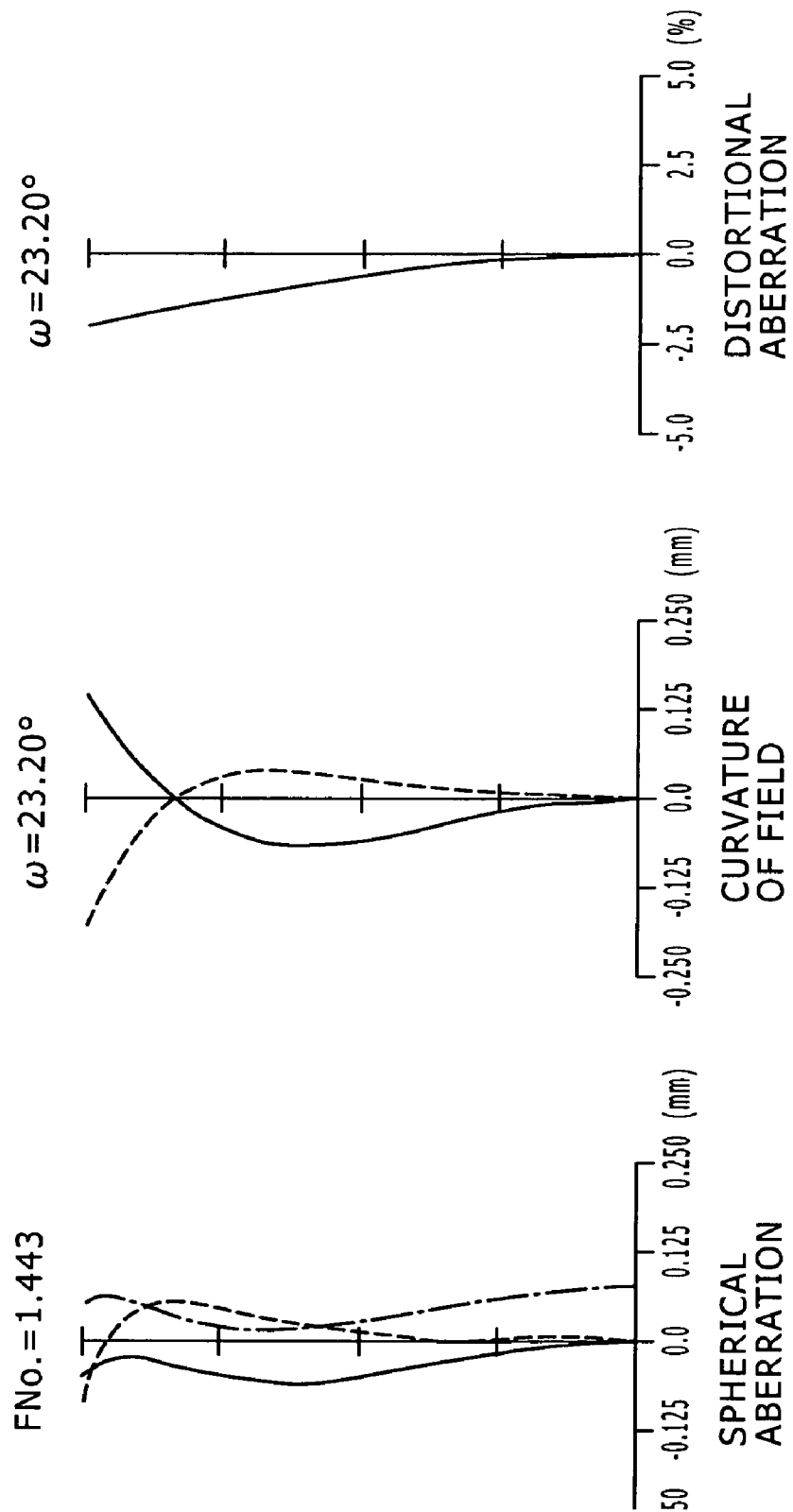
FIG. 8 is a diagrammatic view illustrating a spherical aberration, a curvature of field and a distortional aberration in an infinitely focused state of the image pickup lens of FIG. 7 according to a further numerical value example wherein particular numerical values are applied to the image pickup lens.
Figure 9:
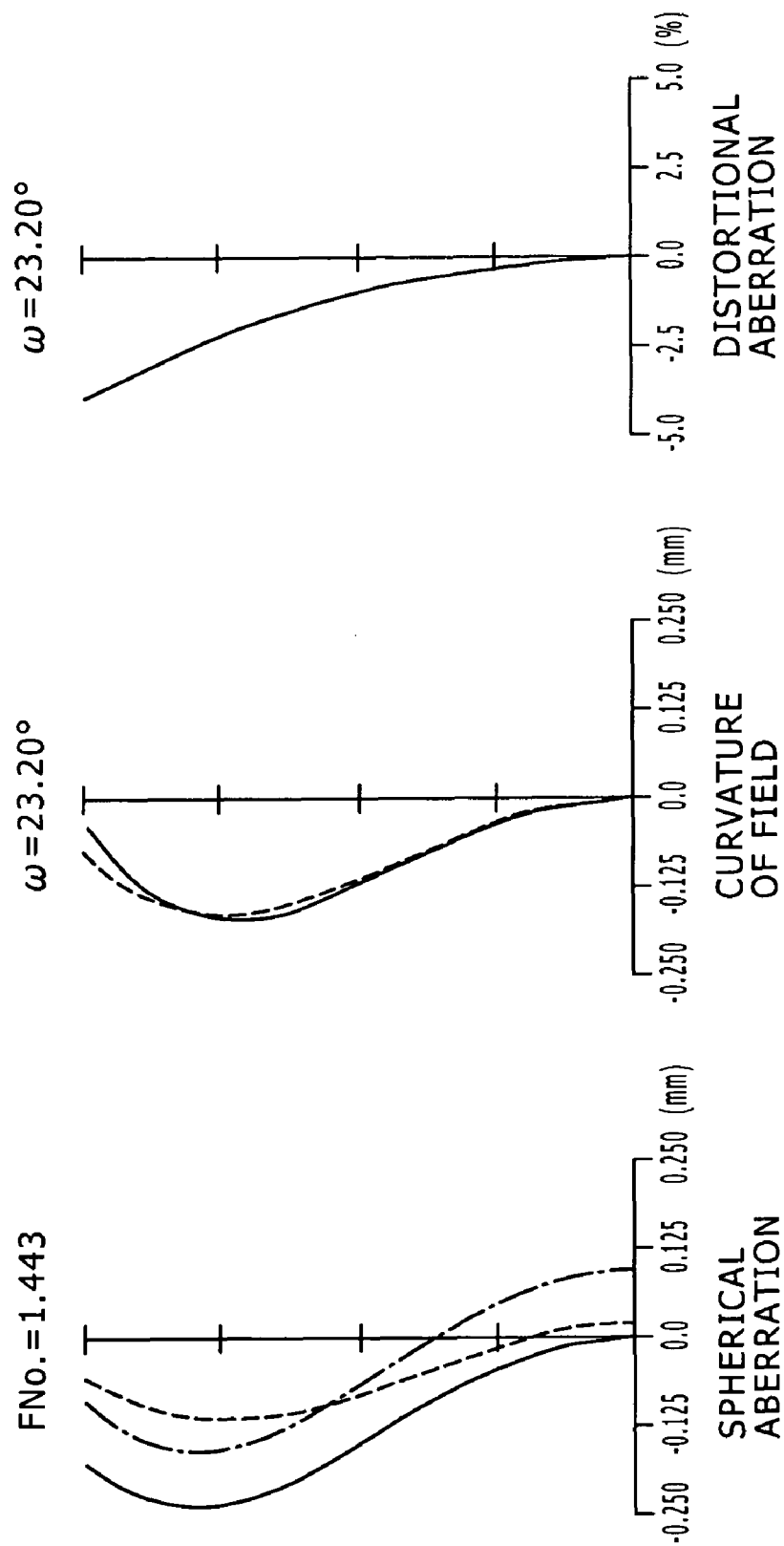
FIG. 9 is a similar view but illustrating a spherical aberration, a curvature of field and a distortional aberration in a proximately focused state of the image pickup lens of FIG. 7 according to the same numerical value example.

FIGS. 8 and 9 illustrate several aberrations in an infinitely focused state of the numerical value example 3. More particularly, FIG. 8 illustrates the aberrations in an infinitely focused state, and FIG. 9 illustrates the aberrations in a proximately focused state.

Referring to FIGS. 8 and 9, in the views of the spherical aberration, the axis of ordinate indicates the ratio of the spherical aberration to the open F value and the axis of abscissa indicates the focus. Further, a solid line indicates the spherical aberration with regard to the d-line (wavelength 587.6 nm); a broken line indicates the spherical aberration with regard to the g-line (wavelength 435.8 nm); and an alternate long and short dash line indicates the spherical aberration with regard to the C-line (wavelength 656.3 nm). In the views of the curvature of field, the axis of ordinate indicates the angle of view and the axis of abscissa indicates the focus. Further, a solid line indicates values of the angle of view on a sagittal image surface while a broken line indicates values of the curvature of field on a meridional image surface. In the views of the distortional aberration, the axis of ordinate indicates the angle of view and the axis of abscissa indicates the ratio.

From the views of the aberrations, it can be recognized apparently that the numerical value example 3 has a superior image formation performance with the aberrations corrected favorably.

Fourth Embodiment

Figure 10:
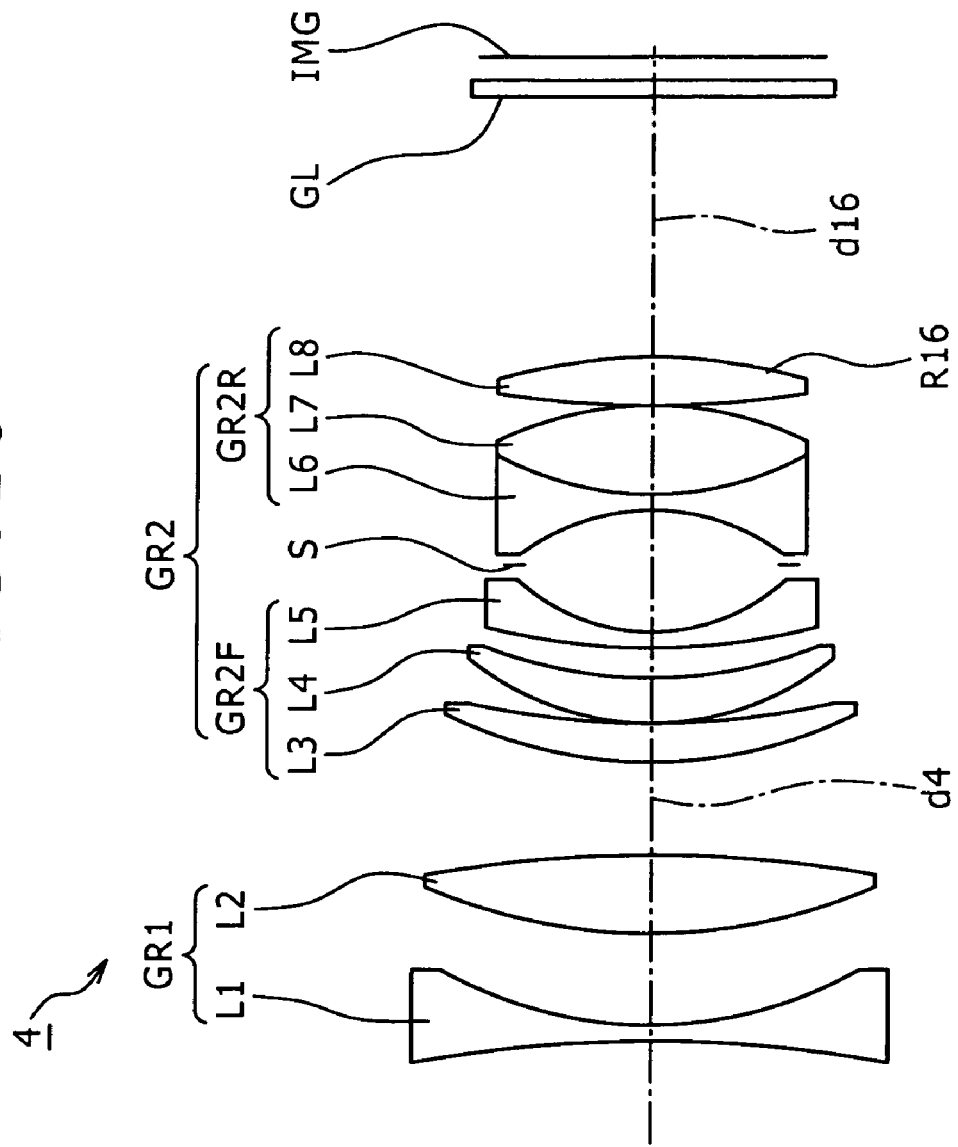
FIG. 10 is a schematic view showing a lens configuration of an image pickup lens according to a fourth embodiment of the present invention.

FIG. 10 shows a lens configuration of an image pickup lens 4 according to a fourth embodiment of the present invention.

Referring to FIG. 10, the image pickup lens 4 includes a first lens group GR1 having a positive refracting power and a second lens group GR2 having a positive refracting power. The first lens group GR1 and the second lens group GR2 are disposed in order from the object side toward the image side.

In the image pickup lens 4, when the image pickup object distance varies from the infinity to the proximity, the first lens group GR1 is fixed with respect to an image surface while the second lens group GR2 moves from the image side toward the object side to carry out focusing.

The first lens group GR1 includes a first lens L1 in the form of a concavo-concave lens and having a negative refracting power, and a second lens L2 in the form of a convexo-convex lens having a positive refracting power. The first lens L1 and the second lens L2 are disposed in order from the object side toward the image side.

The second lens group GR2 includes a front group GR2F disposed on the object side with respect to a stop S and a rear group GR2R disposed on the image side with respect to the stop S.

The front group GR2F includes a third lens L3 in the form of a meniscus lens convex to the object side and having a positive refracting power, a fourth lens L4 in the form of a meniscus lens convex to the object side and having a positive refracting power, and a fifth lens L5 in the form of a meniscus lens convex to the object side and having a negative refracting power. The third lens L3, fourth lens L4 and fifth lens L5 are disposed in order from the object side to the image side.

The rear group GR2R includes a sixth lens L6 in the form of a concavo-concave lens and having a negative refracting power, a seventh lens L7 in the form of a convexo-convex lens and having a positive refracting power, and an eighth lens L8 in the form of a convexo-convex lens having a positive refracting power. The sixth lens L6, seventh lens L7 and eighth lens L8 are disposed in order from the object side toward the image side. The sixth lens L6 and seventh lens L7 are configured as a cemented lens.

A parallel glass plate GL configured from a kind of filter is disposed between the eighth lens L8 and the image surface IMG. The back focus is a distance from an image side face of the eighth lens L8 to the image surface IMG where the parallel glass plate GL is converted into the air.

Table 5 indicates lens data of a numerical value example 4 where particular numerical values are applied to the image pickup lens 4 of the fourth embodiment.

TABLE 5

| i  | Ri           | di          | nd      | vd    |
|----|--------------|-------------|---------|-------|
| 1  | −168.156     | 2.000       | 1.64769 | 33.84 |
| 2  | 55.457       | 11.323      |         |       |
| 3  | 70.194       | 9.854       | 1.83481 | 42.72 |
| 4  | −155.942     | 11.684~1.0  |         |       |
| 5  | 54.017       | 5.077       | 1.80420 | 46.50 |
| 6  | 123.828      | 0.200       |         |       |
| 7  | 36.017       | 5.245       | 1.83481 | 42.72 |
| 8  | 56.786       | 3.970       |         |       |
| 9  | 90.783       | 1.900       | 1.67270 | 32.17 |
| 10 | 24.235       | 8.108       |         |       |
| 11 | ∞            | 6.917       |         |       |
| 12 | −26.060      | 1.800       | 1.74077 | 27.76 |
| 13 | 37.821       | 11.282      | 1.80420 | 46.50 |
| 14 | −44.517      | 0.200       |         |       |
| 15 | 112.316      | 6.000       | 1.80610 | 40.73 |
| 16 | −60.026(ASP) | 32.600~43.284 |       |       |
| 17 | ∞            | 2.000       | 1.51680 | 64.20 |
| 18 | ∞            |             |         |       |

FNo. = 1.233, f = 51.55, ω = 23.02°.

In the image pickup lens 4, an image side face of the eighth lens L8 of the second lens group GR2, that is, the 16th face, is formed as an aspheric face. The fourth-, sixth-, eighth- and tenth-order aspheric face coefficients C4, C6, C8 and C10 of the aspheric face in the numerical value example 4 are indicated in Table 6 together with the conic constant κ.

| i  | K        | C4           | C6            | C8            | C10            |
|----|----------|--------------|---------------|---------------|----------------|
| 16 | 0.000000 | 0.245088E−05 | −0.692726E−09 | 0.202333E−11  | −0.122132E−14  |

Figure 11:
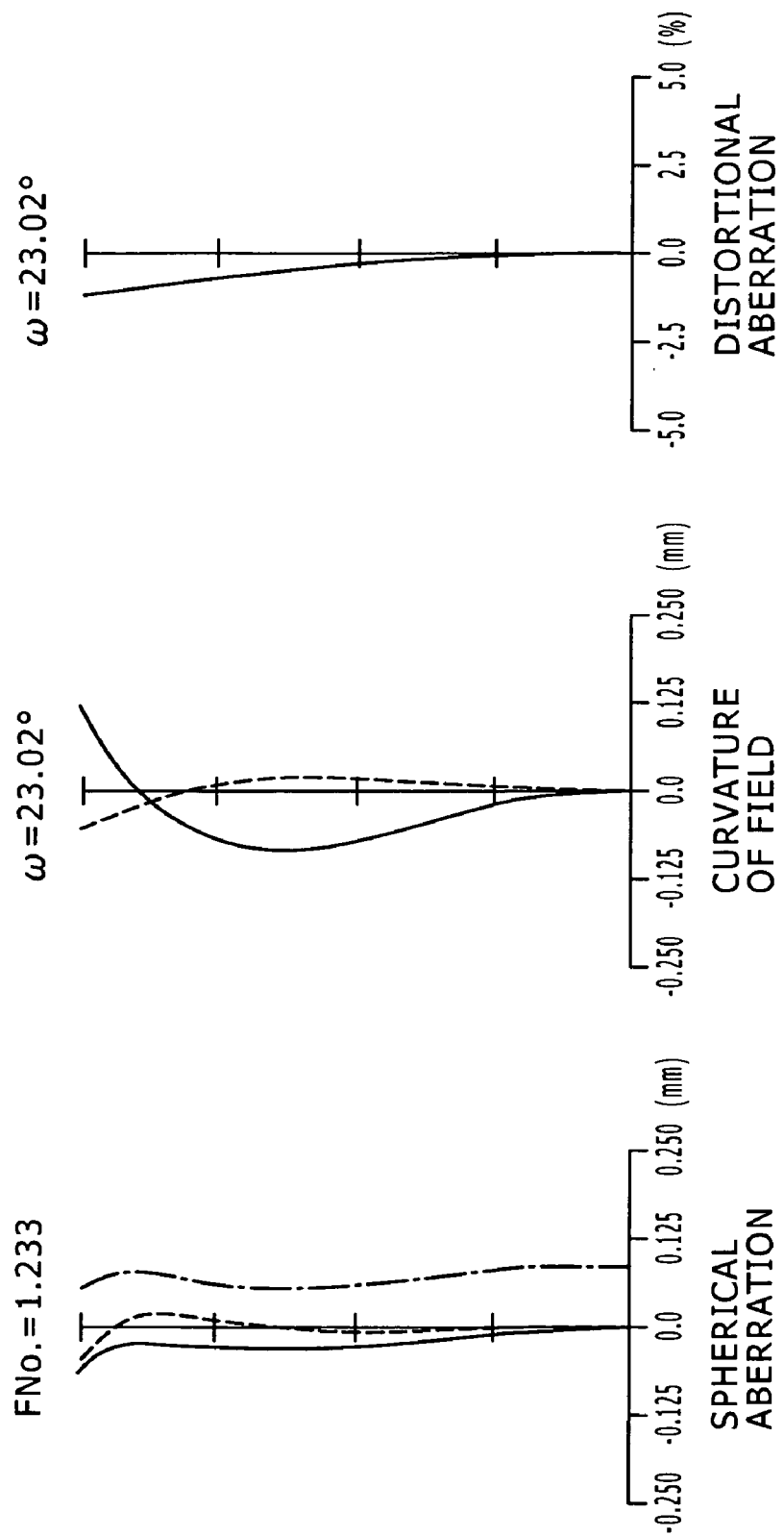
FIG. 11 is a diagrammatic view illustrating a spherical aberration, a curvature of field and a distortional aberration in an infinitely focused state of the image pickup lens of FIG. 10 according to a still further numerical value example wherein particular numerical values are applied to the image pickup lens.
Figure 12:
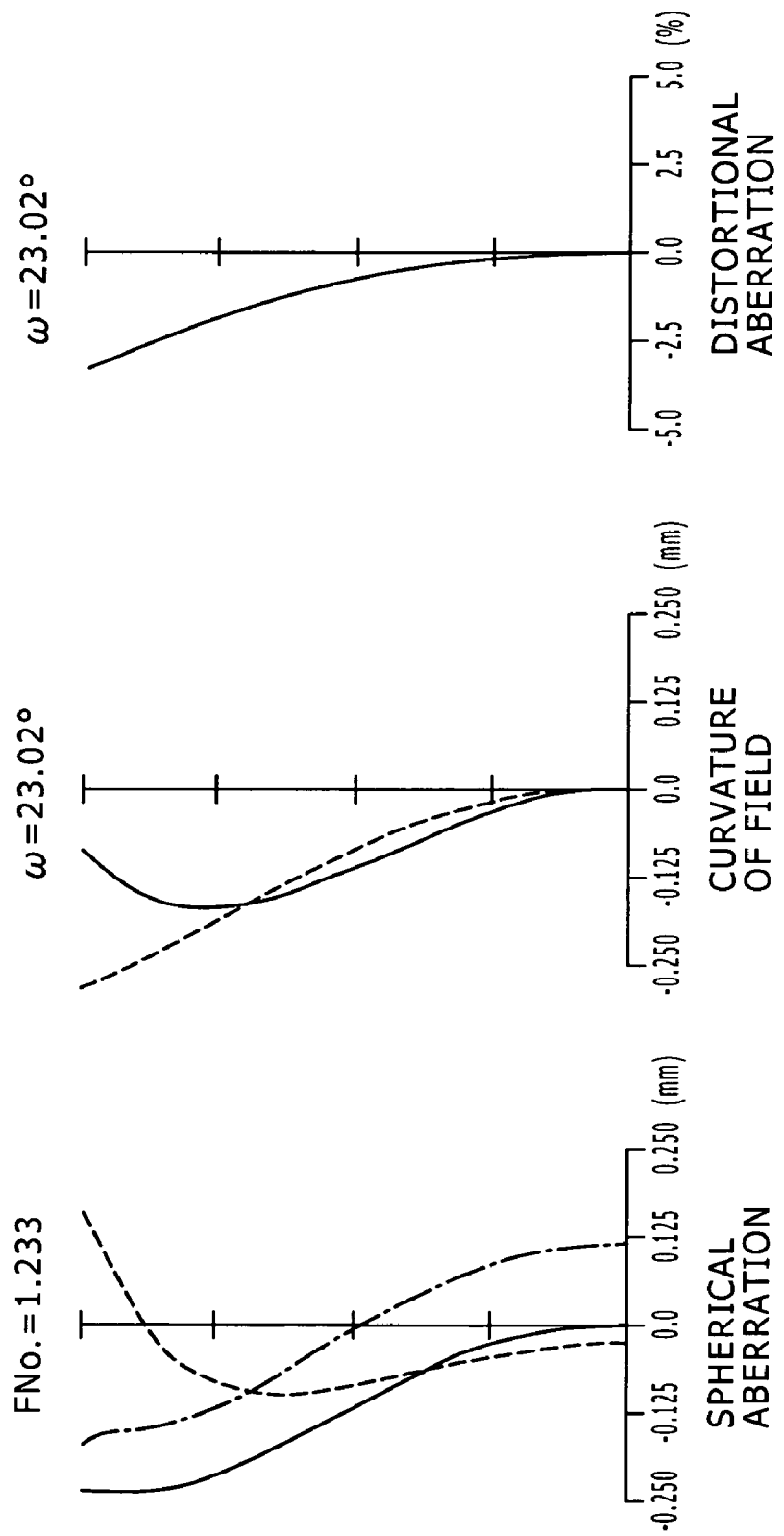
FIG. 12 is a similar view but illustrating a spherical aberration, a curvature of field and a distortional aberration in a proximately focused state of the image pickup lens of FIG. 10 according to the same numerical value example.

FIGS. 11 and 12 illustrate several aberrations in an infinitely focused state of the numerical value example 4. More particularly, FIG. 11 illustrates the aberrations in an infinitely focused state, and FIG. 12 illustrates the aberrations in a proximately focused state.

Referring to FIGS. 11 and 12, in the views of the spherical aberration, the axis of ordinate indicates the ratio of the spherical aberration to the open F value and the axis of abscissa indicates the focus. Further, a solid line indicates the spherical aberration with regard to the d-line (wavelength 587.6 nm); a broken line indicates the spherical aberration with regard to the g-line (wavelength 435.8 nm); and an alternate long and short dash line indicates the spherical aberration with regard to the C-line (wavelength 656.3 nm). In the views of the curvature of field, the axis of ordinate indicates the angle of view and the axis of abscissa indicates the focus. Further, a solid line indicates values of the angle of view on a sagittal image surface while a broken line indicates values of the curvature of field on a meridional image surface. In the views of the distortional aberration, the axis of ordinate indicates the angle of view and the axis of abscissa indicates the ratio.

From the views of the aberrations, it can be recognized apparently that the numerical value example 4 has a superior image formation performance with the aberrations corrected favorably.

Since the image pickup lenses 1 to 4 correct the aberrations favorably in this manner, they are suitable particularly for a digital still camera of the lens interchanging type which includes a comparatively great number of pixels.

Values of the Conditional Expressions for the Image Pickup Lens

In the following, various values of the conditional expressions of the image pickup lens according to the present invention are described.

Various values of the conditional expressions (1) to (7) given hereinabove of the image pickup lenses 1 to 4 are indicated in Table 7.

TABLE 7

|                        |         | Image pickup lens 1 | Image pickup lens 2 | Image pickup lens 3 | Image pickup lens 4 |
|------------------------|---------|---------------------|---------------------|---------------------|---------------------|
|                        | f2      | 62.53               | 64.44               | 63.76               | 62.68               |
|                        | fi      | 49.98               | 51.54               | 51.53               | 51.55               |
| Conditional expression (1) | f2/fi | 1.251           | 1.250               | 1.238               | 1.216               |
|                        | bfi     | 36.96               | 36.98               | 36.98               | 36.98               |
| Conditional expression (2) | fi/bfi | 1.350          | 1.393               | 1.393               | 1.393               |
|                        | f1F     | −50.48              | −48.25              | −48.37              | −64.16              |
|                        | f1R     | 49.84               | 48.43               | 48.58               | 59.16               |
| Conditional expression (3) | |f1F/f1R| | 1.013        | 0.996               | 0.996               | 1.085               |
|                        | R1      | −94.569             | −92.300             | −92.182             | −168.156            |
| Conditional expression (4) | |R1/fi| | 1.892          | 1.791               | 1.789               | 3.262               |

TABLE 7-continued

|                        |         | Image pickup lens 1 | Image pickup lens 2 | Image pickup lens 3 | Image pickup lens 4 |
|------------------------|---------|---------------------|---------------------|---------------------|---------------------|
|                        | R2      | 50.393              | 53.615              | 53.861              | 55.457              |
| Conditional expression (5) | |R2/fi| | 1.008          | 1.040               | 1.045               | 1.076               |

TABLE 7-continued

|  |  | Image pickup lens 1 | Image pickup lens 2 | Image pickup lens 3 | Image pickup lens 4 |
|---|---|---|---|---|---|
|  | R3 | 63.750 | 70.647 | 70.104 | 70.194 |
| Conditional expression (6) | |R2/R3| | 0.790 | 0.759 | 0.768 | 0.790 |
|  | vd1 | 33.84 | 30.05 | 30.05 | 33.84 |
|  | vd2 | 46.5 | 42.72 | 42.72 | 42.72 |
| Conditional expression (7) | vd1/vd2 | 0.728 | 0.703 | 0.703 | 0.792 |

As can be recognized apparently from Table 7, the image pickup lenses 1 to 4 satisfy the conditional expressions (1) to (7).

Configuration of the Image Pickup Apparatus

In the following, image pickup apparatus of an embodiment of the present invention are described.

An image pickup apparatus of the embodiment of the present invention includes an image pickup lens, and an image pickup element for converting an optical image formed by the image pickup lens into an electric signal.

In the image pickup apparatus, the image pickup lens includes a first lens group including a single negative lens and a single positive lens disposed in order from the object side to the image side and having a positive refracting power, and a second lens group having a positive refracting power. The first lens and the second lens are disposed in order from the object side to the image side.

In the image pickup apparatus, when the image pickup object distance varies from the infinity to the proximity, the first lens group is fixed with respect to the image surface while the second lens group is moved from the image side to the object side to carry out focusing.

In the image pickup apparatus, the image pickup lens satisfies the following conditional expressions (1) to (3):

$$1.0 < f2/fi < 1.5 \quad (1)$$

$$1.1 < fi/bfi < 1.5 \quad (2)$$

$$0.7 < |f1F/f1R| < 1.3 \quad (3)$$

where
f2: focal length of the second lens group
fi: focal length of the entire lens system in an infinitely focused state
bfi: back focus of the entire lens system in the infinitely focused state
f1F: focal length of the negative lens of the first lens group
f1R: focal length of the positive lens of the first lens group.

Since the image pickup lens of the image pickup apparatus is configured in such a manner as described above and satisfies the conditional expressions (1) to (3) given above, improvement of an optical performance over a wide range of image pickup distance from the infinity to the proximity and simplification of the lens barrel structure can be achieved.

Particularly, in the image pickup apparatus, the image pickup lens can be used as a large aperture single focus lens which has an F number of approximately 1.2 to 1.5 and an angle of view of approximately 46 degrees and is superior in optical performance over a wide range of image pickup distance from the infinity to the proximity and allows simplification of the lens barrel structure.

The conditional expression (1) defines the focal length of the second lens group.

If the focal length of the second lens group becomes smaller than the lower limit of the conditional expression (1), then it becomes impossible to sufficiently assure the back focus and the variation of the spherical aberration with respect to the variation of the image pickup object distance becomes great, resulting in deterioration of the image formation performance in a proximity region.

On the contrary, if the focal length of the second lens group becomes greater than the upper limit of the conditional expression (1), then the stroke of movement of the second lens group upon focusing becomes great. Consequently, the focusing speed becomes lower and it becomes difficult to achieve reduction of the overall length of the image pickup lens.

Accordingly, where the image pickup lens of the image pickup apparatus satisfies the conditional expression (1), the back focus can be elongated and it becomes possible to suppress the variation of the spherical aberration with respect to the variation of the image pickup object distance. Further, the stroke of movement of the second lens group upon focusing can be decreased and increase of the focusing speed and reduction of the overall length can be anticipated.

The conditional expression (2) defines the amount of the back focus with respect to the focal length.

If the amount of the back focus becomes smaller than the lower limit of the conditional expression (2), then the back focus becomes short, and the image pickup lens becomes inappropriate, for example, as an interchangeable lens for a single-lens reflex camera.

On the contrary, if the amount of the back focus becomes greater than the upper limit of the conditional expression (2), then it becomes necessary to increase the back focus of the second lens group and becomes necessary to configure the second lens group from that of the retrofocus type. Consequently, the image formation performance in a proximity region is deteriorated.

Accordingly, if the image pickup lens of the image pickup apparatus satisfies the conditional expression (2), then it becomes possible to elongate the back focus and enhancement of the image formation performance in a proximity region can be anticipated.

The conditional expression (3) defines the ratio between the focal length of the negative lens and the focal length of the positive lens in the first lens group.

If the ratio between the focal lengths becomes lower than the lower limit of the conditional expression (3), then the refracting power of the negative lens in the first lens group becomes excessively high, and the stroke of movement of the second lens group upon focusing becomes great. Consequently, the focusing speed becomes low and it becomes difficult to reduce the overall length.

On the contrary, if the ratio between the focal lengths becomes higher than the upper limit of the conditional expression (3), then the back focus becomes short and the diameter of the negative lens of the first lens group becomes great. This makes an obstacle to miniaturization.

Accordingly, with the image pickup apparatus if the image pickup lens satisfies the conditional expression (3), then the stroke of movement of the second lens group upon focusing can be reduced and it is possible to increase the focusing speed and reduce the overall length. Further, it is possible to increase the back focus and achieve miniaturization.

It is to be noted that the conditional expression (3) is modified more preferably such that the lower limit is set to 0.85 and the upper limit is set to 1.15.

According to another image pickup apparatus of another embodiment of the present invention, the image pickup lens includes a first lens group including a single negative lens and a single positive lens disposed in order from the object side to the image side and having a positive refracting power, and a second lens group having a positive refracting power, the first lens and the second lens being disposed in order from the object side to the image side.

In the image pickup lens of the image pickup apparatus, when the image pickup object distance varies from the infinity to the proximity, the first lens group is fixed with respect to an image surface while the second lens group is moved from the image side to the object side to carry out focusing. The negative lens of the first lens group is configured from a concavo-concave lens.

In the image pickup apparatus, since the image pickup lens is configured in such a manner as described above, improvement of an optical performance over a wide range of image pickup distance from the infinity to the proximity and simplification of the lens barrel structure can be achieved. Further, the variation of the curvature of field caused by variation of the image pickup object distance can be suppressed.

Particularly, the image pickup lens of the image pickup apparatus can be used as a large aperture single focus lens which has an F number of approximately 1.2 to 1.5 and an angle of view of approximately 46 degrees and is superior in optical performance over a wide range of image pickup distance from the infinity to the proximity and allows simplification of the lens barrel structure.

Form of the Image Pickup Apparatus

Figure 13:
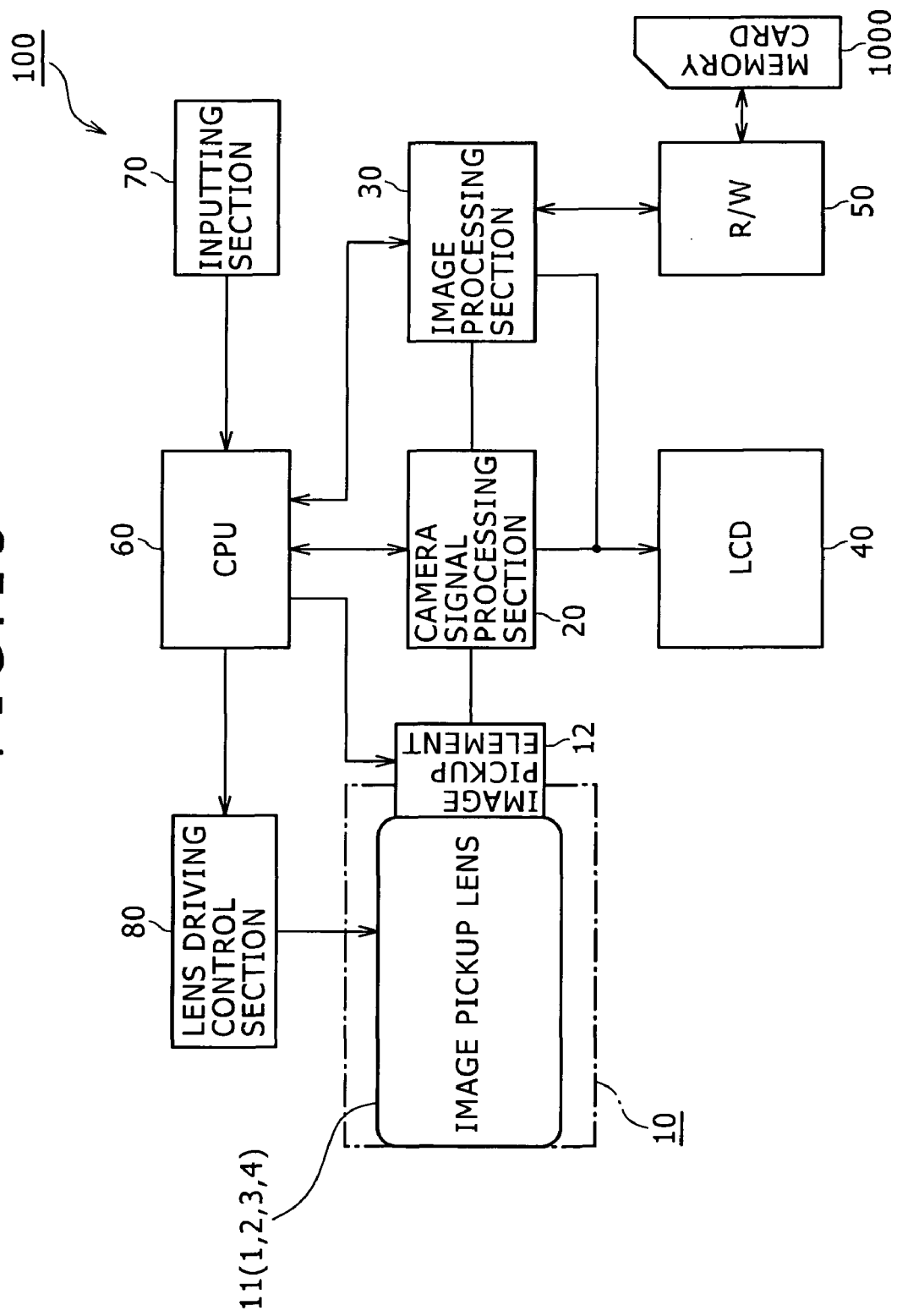
FIG. 13 is a block diagram showing an image pickup apparatus to which the present invention is applied.

A digital still camera which is a form of the image pickup apparatus of the present invention is shown in block diagram in FIG. 13.

Refer to FIG. 13, the image pickup apparatus 100 in the form of a digital still camera includes a camera block 10 having an image pickup function, a camera signal processing section 20 for carrying out signal processing such as analog to digital conversion of an image signal picked up by the camera block 10, and an image processing section 30 for carrying out recording and reproduction processing of the image signal. The image pickup apparatus 100 further includes an LCD (Liquid Crystal Display) unit 40 for displaying a picked up image and so forth thereon, and a reader/writer (R/W) 50 for writing and reading out an image signal into and from a memory card 1000. The image pickup apparatus 100 further includes a CPU (Central Processing Unit) 60 for controlling the entire image pickup apparatus, an inputting section 70 including various switches and so forth for being operated by a user, and a lens driving control section 80 for controlling driving of the lenses disposed in the camera block 10.

The camera block 10 includes an optical system including an image pickup lens 11 which may be the image pickup lens 1, 2, 3 or 4 to which the present invention is applied, an image pickup element 12 such as a CCD (Charge Coupled Device) unit or a CMOS (Complementary Metal-Oxide Semiconductor) unit, and so forth.

The camera signal processing section 20 carries out various signal processes such as conversion into a digital signal, noise removal, picture quality correction and conversion into luminance and color difference signals for an output signal from the image pickup element 12.

The image processing section 30 carries out compression coding and decompression decoding processes of an image signal based on a predetermined image data format, a conversion process of data specifications such as the resolution, and so forth.

The LCD unit 40 has a function of displaying various data such as data representative of an operation state of the inputting section 70 by a user, a picked up image and so forth.

The reader/writer 50 carries out writing of image data encoded by the image processing section 30 into the memory card 1000 and reading out of image data recorded in the memory card 1000.

The CPU 60 functions as a control processing section for controlling the circuit blocks provided in the image pickup apparatus 100 and controls the circuit blocks based on an instruction input signal from the inputting section 70 and so forth.

The inputting section 70 includes, for example, a shutter release button for carrying out a shutter operation, a selection switch for selecting an operation mode, and so forth and outputs an instruction input signal representative of an operation by the user to the CPU 60.

The lens driving control section 80 controls motors and so forth not shown for driving the lenses of the image pickup lens 11 in accordance with a control signal from the CPU 60.

The memory card 1000 is, for example, a semiconductor memory removably inserted in a slot connected to the reader/writer 50.

Operation of the image pickup apparatus 100 is described below.

In a standby state for image pickup, an image signal picked up by the camera block 10 is outputted to the LCD unit 40 through the camera signal processing section 20 and displayed as a camera-through image on the LCD unit 40 under the control of the CPU 60. On the other hand, if an instruction input signal for zooming from the inputting section 70 is inputted, then the CPU 60 outputs a control signal to the lens driving control section 80 so that a predetermined lens or lenses of the image pickup lens 11 are moved under the control of the lens driving control section 80.

If a shutter not shown of the camera block 10 is rendered operative in accordance with an instruction input signal from the inputting section 70, then the picked up image signal is outputted from the camera signal processing section 20 to the image processing section 30, by which it is subjected to a compression coding process so that it is converted into digital data of a predetermined data format. The resulting data is outputted to the reader/writer 50 and written into the memory card 1000.

It is to be noted that focusing is carried out, for example, when the shutter release button of the inputting section 50 is half-depressed or fully depressed for recording or image pickup or in a like case, by the lens driving control section 80 moving a predetermined lens or lenses of the image pickup lens 11 in accordance with a control signal from the CPU 60.

When image data recorded in the memory card 1000 is to be reproduced, predetermined image data is read out from the memory card 1000 by the reader/writer 50 in response to an operation of the inputting section 70 and is subjected to a decompression decoding process by the image processing section 30. Then, a reproduction image signal is outputted to the LCD unit 40, by which a reproduction image is displayed.

It is to be noted that, while, in the form of the image pickup apparatus described above, it is applied to a digital still camera, the range of application of the image pickup apparatus is not limited to a digital still camera, but the image pickup apparatus can be applied widely as a camera section or the like to digital inputting and/or outputting apparatus such as a digital video camera, a portable telephone set in which a camera is incorporated and a PDA (Personal Digital Assistant) in which a camera is incorporated.

The shapes and the numerical values of the components of the embodiments described hereinabove are mere examples for embodying the present invention, and the technical scope of the present invention shall not be interpreted restrictively by them.

The present application contains subject matter related to that disclosed in Japanese Priority Patent Application JP 2009-262924 filed in the Japan Patent Office on Nov. 18, 2009, the entire content of which is hereby incorporated by reference.

While preferred embodiments of the present invention have been described using specific terms, such description is for illustrative purposes only, and it is to be understood that changes and variations may be made without departing from the spirit or scope of the following claims.

What is claimed is:

1. An image pickup lens, comprising:
a first lens group including a single negative lens and a single positive lens disposed in order from the object side to the image side and having a positive refracting power; and
a second lens group having a positive refracting power;
said first lens group and said second lens group being disposed in order from the object side to the image side;
said first lens group being fixed, when the image pickup object distance varies from the infinity to the proximity, with respect to an image surface while said second lens group is moved from the image side to the object side to carry out focusing;
said image pickup lens satisfying the following conditional expressions (1) to (3):

$$1.0 < f2/fi < 1.5 \quad (1)$$

$$1.1 < fi/bfi < 1.5 \quad (2)$$

$$0.7 < |f1F/f1R| < 1.3 \quad (3)$$

where
f2: focal length of said second lens group
fi: focal length of the entire lens system in an infinitely focused state
bfi: back focus of the entire lens system in the infinitely focused state
f1F: focal length of said negative lens of said first lens group
f1R: focal length of said positive lens of said first lens group.

2. The image pickup lens according to claim 1, wherein said negative lens of said first lens group is configured from a concavo-concave lens, and
said image pickup lens satisfies the following conditional expressions (4) and (5):

$$0.7 < |R1/fi| < 5 \quad (4)$$

$$0.7 < |R2/fi| < 1.5 \quad (5)$$

where
R1: radius of curvature of a face on the object side of said negative lens of said first lens group
R2: radius of curvature of a face on the image side of said negative lens of said first lens group.

3. The image pickup lens according to claim 2, wherein said positive lens of said first lens group is configured from a convexo-convex lens, and
said image pickup lens satisfies the following conditional expression (6):

$$0.6 < |R2/R3| < 1.5 \quad (6)$$

where
R3: radius of curvature of a face on the object side of said positive lens of said first lens group.

4. The image pickup lens according to claim 3, wherein said second lens group includes a lens or lenses having at least one aspheric face.

5. The image pickup lens according to claim 3, wherein said second lens group has two concave faces opposing to each other with a stop positioned therebetween.

6. The image pickup lens according to claim 1, wherein said image pickup lens satisfies the following conditional expression (7):

$$0.6 < vd1/vd2 < 0.85 \quad (7)$$

where
vd1: Abbe number of said negative lens of said first lens group with regard to the d-line
vd2: Abbe number of said positive lens of said first lens group with regard to the d-line.

7. An image pickup lens, comprising:
a first lens group including a single negative lens and a single positive lens disposed in order from the object side to the image side and having a positive refracting power; and
a second lens group having a positive refracting power;
said first lens group and said second lens group being disposed in order from the object side to the image side;
said first lens group being fixed, when the image pickup object distance varies from the infinity to the proximity, with respect to an image surface while said second lens group is moved from the image side to the object side to carry out focusing;
said negative lens of said first lens group being configured from a concavo-concave lens.

8. The image pickup lens according to claim 7, wherein said second lens group has two concave faces opposing to each other with a stop positioned therebetween.

9. An image pickup apparatus, comprising:
an image pickup lens; and
an image pickup element for converting an optical image formed by said image pickup lens into an electric signal;
said image pickup lens including
a first lens group including a single negative lens and a single positive lens disposed in order from the object side to the image side and having a positive refracting power, and
a second lens group having a positive refracting power,
said first lens group and said second lens group being disposed in order from the object side to the image side,
said first lens group being fixed, when the image pickup object distance varies from the infinity to the proximity, with respect to an image surface while said second lens group is moved from the image side to the object side to carry out focusing;
said image pickup lens satisfying the following conditional expressions (1) to (3):

$$1.0 < f2/fi < 1.5 \quad (1)$$

$$1.1 < fi/bfi < 1.5 \quad (2)$$

$$0.7 < |f1F/f1R| < 1.3 \quad (3)$$

where
f2: focal length of said second lens group
fi: focal length of the entire lens system in an infinitely focused state bfi: back focus of the entire lens system in the infinitely focused state f1F: focal length of said negative lens of said first lens group f1R: focal length of said positive lens of said first lens group.

10. An image pickup apparatus, comprising:

an image pickup lens; and an image pickup element for converting an optical image formed by said image pickup lens into an electric signal;

said image pickup lens including a first lens group including a single negative lens and a single positive lens disposed in order from the object side to the image side and having a positive refracting power, and a second lens group having a positive refracting power, said first lens group and said second lens group being disposed in order from the object side to the image side, said first lens group being fixed, when the image pickup object distance varies from the infinity to the proximity, with respect to an image surface while said second lens group is moved from the image side to the object side to carry out focusing, said negative lens of said first lens group being configured from a concavo-concave lens.

* * * * *